US008355437B2

(12) United States Patent
Hannuksela

(10) Patent No.: US 8,355,437 B2
(45) Date of Patent: Jan. 15, 2013

(54) VIDEO ERROR RESILIENCE

(75) Inventor: Miska Hannuksela, Tampere (FI)

(73) Assignee: ROAC ND Investments L.L.C., Wilmington, DE (US)

( * ) Notice: Subject to any disclaimer, the term of this patent is extended or adjusted under 35 U.S.C. 154(b) by 1538 days.

(21) Appl. No.: 11/037,192

(22) Filed: Jan. 19, 2005

(65) Prior Publication Data

US 2005/0123045 A1    Jun. 9, 2005

Related U.S. Application Data

(63) Continuation of application No. 09/893,591, filed on Jun. 29, 2001, now abandoned.

(30) Foreign Application Priority Data

Jun. 30, 2000    (GB) .................................. 0016243.8

(51) Int. Cl.
*H04N 7/12* (2006.01)
*H04N 11/02* (2006.01)
*H04N 11/04* (2006.01)

(52) U.S. Cl. ......... 375/240.12; 375/240.13; 375/240.14; 375/240.16; 375/240.15

(58) Field of Classification Search ............. 375/240.01, 375/240.12–240.16; 348/700
See application file for complete search history.

(56) References Cited

U.S. PATENT DOCUMENTS

| 5,481,553 | A |  | 1/1996 | Suzuki et al. |
| 5,592,226 | A |  | 1/1997 | Lee et al. |
| 5,745,181 | A |  | 4/1998 | Wilkinson ................... 348/415 |
| 5,754,233 | A |  | 5/1998 | Takashima |
| 5,757,968 | A |  | 5/1998 | Ando |
| 5,774,593 | A |  | 6/1998 | Zick et al. |
| 5,825,425 | A |  | 10/1998 | Kazui et al. ................... 348/420 |
| 5,832,121 | A |  | 11/1998 | Ando |
| 5,874,997 | A | * | 2/1999 | Haigh ...................... 375/240.25 |
| 6,057,893 | A | * | 5/2000 | Kojima et al. ................ 348/700 |
| 6,526,097 | B1 | * | 2/2003 | Sethuraman et al. ...... 375/240.2 |

FOREIGN PATENT DOCUMENTS

| JP | 2200084 | 8/1990 |
| JP | 2234586 | 9/1990 |
| JP | 06-022300 | 1/1994 |
| JP | 9149421 | 6/1997 |

(Continued)

OTHER PUBLICATIONS

IBM Technical Disclosure Bulletin, vol. 39, No. 4, Apr. 1996, pp. 43-44.

(Continued)

*Primary Examiner* — Nhon Diep
*Assistant Examiner* — Chikaodili E Anyikire

(57) ABSTRACT

The invention provides a method that reduces degradation in the perceived quality of images in a video sequence due to data loss. This effect is achieved by effectively delaying the insertion of an INTRA coded frame after a periodic INTRA frame refresh, INTRA update request, or scene cut. Frames associated with INTRA frame requests are not themselves coded in INTRA format, but instead a frame occurring later in the video sequence is chosen for coding in INTRA format. Preferably, the actual INTRA frame is selected such that it lies approximately mid-way between periodic INTRA requests. Frames occurring prior to the actual INTRA coded frame are encoded using temporal prediction, in reverse order, starting from the actual INTRA frame, while those frames occurring after the INTRA coded frame are encoded using temporal prediction in the forward direction.

58 Claims, 9 Drawing Sheets

FOREIGN PATENT DOCUMENTS

| | | |
|---|---|---|
| JP | 2000115784 | 4/2000 |
| WO | WO-92/20191 | 11/1992 |
| WO | WO 94/21083 | 3/1994 |

OTHER PUBLICATIONS

J. Lee, et al, "Temporally Adaptive Motion Interpolation Exploiting Temporal Masking in Visual Perception", IEEE Transactions on Image Processing, Sep. 3, 1994, No. 5, pp. 513-526.

L. Lee, et al "On the Error Distribution and Scene Change for the Bit Rate Control of MPEG", IEEE Transactions on Consumer Electronics, Aug. 1993, No. 3, pp. 545-554.

Guy Cote, et al., H.263+: Video Coding at Low Bit Rates, IEEE Transactions on Circuits and Systems For Video Technology, vol. 8, No. 7, Nov. 1998; pp. 849-866.

Stephan Wenger et al., Proposed Draft of modified Annex L including Copyright, normative Error Concealment, and Exact IDCT Signaling, ITU—Telecommunications Standardization Sector Study Group 16 Video Coding Experts Group (Question 15), Ninth Meeting: Red Bank, New Jersey, Oct. 1999, Document Q15-I-22, pp. 1-10.

English translation of Office action for Japanese Application No. 2001-585224 dated Nov. 16, 2010.

Office Action issued on Japanese Application 2002-505524, mailed Jul. 12, 2011 (English translation not available).

International Preliminary Examination Report for PCT/EP01/07366, completed Aug. 23, 2002.

International Search Report for PCT/EP01/07366 mailed Jul. 4, 2002.

Non-Final Office Action on U.S. Appl. No. 09/893,591, mailed Jul. 19, 2004.

* cited by examiner

MULTIMEDIA CONTENT CREATION AND RETRIEVAL SYSTEM

GENERIC MULTIMEDIA TERMINAL

VIDEO ERROR RESILIENCE

CROSS REFERENCE TO RELATED APPLICATION

The present application is a Continuation Application of U.S. application Ser. No. 09/893,591, filed Jun. 29, 2001, now abandoned the contents of which are incorporated herein by reference.

BACKGROUND OF THE INVENTION

The present invention relates to the transmission of multimedia data over communications networks. More specifically, it concerns the transmission of video data over networks that are prone to error. The invention provides a new method whereby degradation in the perceived quality of video images due to data loss can be mitigated.

To appreciate the benefits provided by the invention, it is advantageous to review the framework of a typical multimedia content creation and retrieval system known from prior art and to introduce the characteristics of compressed video sequences. While the description in the following paragraphs concentrates on the retrieval of stored multimedia data in networks where information is transmitted using packet-based data protocols (e.g. the Internet), it should be appreciated that the invention is equally applicable to circuit switched networks such as fixed line PSTN (Public Service Telephone Network) or mobile PLMN (Public Land Mobile Network) telephone systems. It can also be applied in networks that use a combination of packet-based and circuit switched data transmission protocols. For example, the Universal Mobile Telephone System (UMTS) currently under standardisation may contain both circuit switched and packet-based elements. The invention is applicable to non-real time applications, such as video streaming, as well as to real-time communication applications such as video telephony.

A typical multimedia content creation and retrieval system is presented in FIG. 1. The system, referred to in general by reference number 1, has one or more sources of multimedia content 10. These sources may comprise, for example, a video camera and a microphone, but other elements may also be present. For example, the multimedia content may also include computer-animated graphics, or a library of data files stored on a mass storage medium such as a networked hard drive.

To compose a multimedia clip comprising different media types (referred to as 'tracks'), raw data captured or retrieved from the various sources 10 are combined. In the multimedia creation and retrieval system shown in FIG. 1, this task is performed by an editor 12. The storage space required for raw multimedia data is huge, typically many megabytes. Thus, in order to facilitate attractive multimedia retrieval services, particularly over low bit-rate channels, multimedia clips are typically compressed during the editing process. Once the various sources of raw data have been combined and compressed to form multimedia clips, the clips are handed to a multimedia server 14. Typically, a number of clients 16 can access the server over some form of network, although for ease of understanding only one such client is illustrated in FIG. 1.

The server 14 is able to respond to requests and control commands 15 presented by the clients. The main task for the server is to transmit a desired multimedia clip to the client 16. Once the clip has been received by the client, it is decompressed at the client's terminal equipment and the multimedia content is 'played back'. In the playback phase, each component of the multimedia clip is presented on an appropriate playback means 18 provided in the client's terminal equipment, e.g. video content is presented on the display of the terminal equipment and audio content is reproduced by a loudspeaker or the like.

The operations performed by the multimedia clip editor 12 will now be explained in further detail with reference to FIG. 2. Raw data is captured by a capture device 20 from one or more data sources 10. The data is captured using hardware, dedicated device drivers (i.e. software) and a capturing application program that uses the hardware by controlling its device drivers. For example, if the data source is a video camera, the hardware necessary to capture video data may consist of a video grabber card attached to a personal computer. The output of the capture device 20 is usually either a stream of uncompressed data or slightly compressed data with irrelevant quality degradations when compared with uncompressed data. For example, the output of a video grabber card could be video frames in an uncompressed YUV 4:2:0 format, or in a motion-JPEG image format. The term 'stream' is used to denote the fact that, in many situations, multimedia data is captured from the various sources in real-time, from a continuous 'flow' of raw data. Alternatively, the sources of multimedia data may be in the form of pre-stored files, resident on a mass storage medium such as a network hard drive.

An editor 22 links together separate media streams, obtained from the individual media sources 10, into a single time-line. For example, multimedia streams that should be played back synchronously, such as audio and video content, are linked by providing indications of the desired playback times of each frame. Indications regarding the desired playback time of other multimedia streams may also be provided. To indicate that the initially independent multimedia streams are now linked in this way, the term multimedia 'track' is used from this point on as a generic term to describe the multimedia content. It may also be possible for the editor 22 to edit the media tracks in various ways. For example the video frame rate may be reduced to half or the spatial resolution of video images may be decreased.

In the compression phase 24, each media track may be compressed independently, in a manner appropriate for the media type in question. For example, an uncompressed YUV 4:2:0 video track could be compressed using ITU-T recommendation H.263 for low bit-rate video coding. In the multiplexing phase 26, the compressed media tracks are interleaved so that they form a single bit-stream. This single bit-stream, comprising a multiplicity of different media types is termed a 'multimedia clip'. However, it should be noted that multiplexing is not essential to provide a multimedia bit-stream. The clip is next handed to the multimedia server 14.

The operation of the multimedia server 14 is now discussed in more detail with reference to the flowchart presented in FIG. 3. Typically, multimedia servers have two modes of operation, non-real time and real-time. In other words, a multimedia server can deliver either pre-stored multimedia clips or a live (real-time) multimedia stream. In the former case, clips must first be stored in a server database 30, which is then accessed by the server in an 'on-demand' fashion. In the latter case, multimedia clips are handed to the server by the editor 12 as a continuous media stream that is immediately transmitted to the clients 16. A server may remove and compress some of the header information used in the multiplexing format and may encapsulate the media clip into packets suitable for delivery over the network. Clients control the operation of the server using a 'control protocol' 15. The minimum set of controls provided by the control protocol consists of a function to select a desired media clip. In addition, servers may support more advanced controls. For example, clients 16 may be able to stop the transmission of a clip, or to pause and resume its transmission. Additionally, clients may be able to control the media flow should the throughput of the transmission channel vary for some reason. In this case, the server dynamically adjusts the bit-stream to utilise the bandwidth available for transmission.

Modules belonging to a typical multimedia retrieval client 16 are presented in FIG. 4. When retrieving a compressed and multiplexed media clip from a multimedia server, the client first demultiplexes the clip 40 in order to separate the different media tracks contained within the clip. Then, the separate media tracks are decompressed 42. Next the decompressed (reconstructed) media tracks are played back using the client's output devices 18. In addition to these operations, the client includes a controller unit 46 that interfaces with the end-user, controls the playback according to the user input and handles client-server control traffic. It should be noted that the demultiplexing, decompression and playback operations may be performed while still downloading subsequent parts of the clip. This approach is commonly referred to as 'streaming'. Alternatively, the client may download the whole clip, demultiplex it, decompress the contents of the individual media tracks and only then start the playback function.

Next the nature of digital video sequences suitable for transmission in communications networks will be described. Video sequences, like ordinary motion pictures recorded on film, comprise a sequence of still images, the illusion of motion being created by displaying the images one after the other at a relatively fast rate, typically 15-30 frames per second. Because of the relatively fast frame rate, images in consecutive frames tend to be quite similar and thus contain a considerable amount of redundant information. For example, a typical scene comprises some stationary elements, e.g. the background scenery, and some moving areas which may take many different forms, for example the face of a newsreader, moving traffic and so on. Alternatively, the camera recording the scene may itself be moving, in which case all elements of the image have the same kind of motion. In many cases, this means that the overall change between one video frame and the next is rather small. Of course, this depends on the nature of the movement. For example, the faster the movement, the greater the change from one frame to the next. Similarly, if a scene contains a number of moving elements, the change from one frame to the next is greater than in a scene where only one element is moving.

Video compression methods are based on reducing the redundant and perceptually irrelevant parts of video sequences. The redundancy in video sequences can be categorized into spatial, temporal and spectral redundancy. 'Spatial redundancy' is the term used to describe the correlation between neighboring pixels. The term 'temporal redundancy' expresses the fact that the objects appearing in one image are likely to appear in subsequent images, while 'spectral redundancy' refers to the correlation between different color components of the same image.

Sufficiently efficient compression cannot usually be achieved by simply reducing the various forms of redundancy in a given sequence of images. Thus, most current video encoders also reduce the quality of those parts of the video sequence which are subjectively the least important. In addition, the redundancy of the encoded bit-stream itself is reduced by means of efficient lossless coding of compression parameters and coefficients. Typically, this is achieved using a technique known as 'variable length coding' (VLC).

Video compression methods typically make use of 'motion compensated temporal prediction'. This is a form of temporal redundancy reduction in which the content of some (often many) frames in a video sequence can be 'predicted' from other frames in the sequence by tracing the motion of objects or regions of an image between frames. Compressed images which do not utilize temporal redundancy reduction methods are usually called INTRA or I-frames, whereas temporally predicted images are called INTER or P-frames. In the INTER frame case, the predicted (motion-compensated) image is rarely precise enough, and therefore a spatially compressed prediction error image is also associated with each INTER frame. Many video compression schemes also introduce bi-directionally predicted frames, which are commonly referred to as B-pictures or B-frames. B-pictures are inserted between reference or so-called 'anchor' picture pairs (I or P frames) and are predicted from either one or both of the anchor pictures, as illustrated in FIG. 5. As can be seen from the figure, the sequence starts with an INTRA or I frame 50. B-pictures (denoted generally by the reference number 52) normally yield increased compression compared with forward-predicted P-pictures 54. In FIG. 5, arrows 51*a* and 51*b* illustrate the bi-directional prediction process, while arrows 53 denote forward prediction. B-pictures are not used as anchor pictures, i.e. no other frames are predicted from them and therefore, they can be discarded from the video sequence without causing deterioration in the quality of future pictures. It should be noted that while B-pictures may improve compression performance when compared with P-pictures, they require more memory for their construction, their processing requirements are more complex, and their use introduces additional delays.

It should be apparent from the above discussion of temporal prediction that the effects of data loss, leading to the corruption of image content in a given frame, will propagate in time, causing corruption of subsequent frames predicted from that frame. It should also be apparent that the encoding of a video sequence begins with an INTRA frame, because at the beginning of a sequence no previous frames are available to form a reference for prediction. However, it should be noted that, when displayed, for example at a client's terminal equipment 18, the playback order of the frames may not be the same as the order of encoding/decoding. Thus, while the encoding/decoding operation starts with an INTRA frame, this does not mean that the frames must be played back starting with an INTRA frame.

More information about the different picture types used in low bit-rate video coding can be found in the article: "H.263+: Video Coding at Low Bit-rates", G. Cote, B. Erol, M. Gallant and F. Kossentini, in IEEE Transactions on Circuits and Systems for Video Technology, November 1998.

In the light of the information provided above concerning the nature of currently known multimedia retrieval systems and video coding (compression) techniques, it should be appreciated that a significant problem may arise in the retrieval/streaming of video sequences over communications networks. Because video frames are typically predicted one from the other, compressed video sequences are particularly prone to transmission errors. If data loss occurs due to a network transmission error, information about the content of the video stream will be lost. The effect of the transmission error may vary. If information vital to reconstruction of a video frame is lost (e.g. information stored in a picture header), it may not be possible to display the image at the receiving client. Thus, the entire frame and any sequence of frames predicted from it are lost (i.e. cannot be reconstructed and displayed). In a less severe case, only part of the image content is affected. However, frames predicted from the corrupted frame are still affected and the error propagates both temporally and spatially within the image sequence until the next INTRA frame is transmitted and correctly reconstructed. This is a particularly severe problem in very low bit-rate communications, where INTRA frames may be transmitted only infrequently (e.g. one INTRA frame every 10 seconds).

The nature of transmission errors varies depending on the communications network in question. In circuit switched networks, such as fixed line and mobile telephone systems, transmission errors generally take the form of bit reversals. In other words, the digital data representing e.g. the video content of a multimedia stream, is corrupted in such a manner that 1's are turned into 0's and vice versa, leading to misrepresentation of the image content. In mobile telephone networks, bit reversal errors typically arise as a result of a decrease in the quality of the radio link.

In networks that utilise packet switched data communication, transmission errors take the form of packet losses. In this kind of network, data packets are usually lost as a result of congestion in the network. If the network becomes congested, network elements, such as gateway routers, may discard data packets and, if an unreliable transport protocol such as UDP (User Datagram Protocol) is used, lost packets are not retransmitted. Furthermore, from the network point of view, it is beneficial to transmit relatively large packets containing several hundreds of bytes and consequently, a lost packet may contain several pictures of a low bit-rate video sequence. Normally, the majority of video frames are temporally predicted INTER frames and thus the loss of one or more such pictures has serious consequences for the quality of the video sequence as reconstructed at the client terminal. Not only may one or more frames be lost, but all subsequent images predicted from those frames will be corrupted.

A number of prior art methods address the problems associated with the corruption of compressed video sequences due to transmission errors. Generally, they are referred to as 'error resilience' methods and typically they fall into two categories: error correction and concealment methods. Error correction refers to the capability of recovering erroneous data perfectly as if no errors had been introduced in the first place. For example, retransmission can be considered an error correction method. Error concealment refers to the capability to conceal the effects of transmission errors so that they should be hardly visible in the reconstructed video. Error concealment methods typically fall into three categories: forward error concealment, error concealment by post-processing and interactive error concealment. Forward error concealment refers to those techniques in which the transmitting terminal adds a certain degree of redundancy to the transmitted data so that the receiver can easily recover the data even if transmission errors occur. For example, the transmitting video encoder can shorten the prediction paths of the compressed video signal. On the other hand, error concealment by post-processing is totally receiver-oriented. These methods try to estimate the correct representation of erroneously received data. The transmitter and receiver may also co-operate in order to minimise the effect of transmission errors. These methods rely heavily on feedback information provided by the receiver. Error concealment by post-processing can also be referred to as passive error concealment whereas the other two categories represent forms of active error concealment. The present invention belongs to the category of methods that shorten prediction paths used in video compression. It should be noted that methods introduced below are equally applicable to compressed video streams transmitted over packet switched or circuit switched networks. The nature of the underlying data network and the type of transmission errors that occur are essentially irrelevant, both to this discussion of prior art and to the application of the present invention.

Error resilience methods that shorten the prediction paths within video sequences are based on the following principle. If a video sequence contains a long train of INTER frames, loss of image data as a result of transmission errors will lead to corruption of all subsequently decoded INTER frames and the error will propagate and be visible for a long time in the decoded video stream. Consequently, the error resilience of the system can be improved by decreasing the length of the INTER frame sequences within the video bit-stream. This may be achieved by: 1. increasing the frequency of INTRA frames within the video stream, 2. using B-frames, 3. using reference picture selection and 4. employing a technique known as video redundancy coding.

It can be shown that the prior-art methods for reducing the prediction path length within video sequences all tend to increase the bit-rate of the compressed sequence. This is an undesirable effect, particularly in low bit-rate transmission channels or in channels where the total available bandwidth must be shared between a multiplicity of users. The increase in bit-rate depends on the method employed and the exact nature of the video sequence to be coded.

In the light of the arguments presented above, concerning the nature of multi-media retrieval systems and compressed video sequences, it will be appreciated that there exists a significant problem relating to limiting the effect of transmission errors on perceived image quality. While some prior art methods address this problem by limiting the prediction path length used in compressed video sequences, in the majority of cases, their use results in an increase in the bit-rate required to code the sequence. It is therefore an object of the present invention to improve the resilience of compressed video sequences to transmission errors while maintaining an acceptably low bit-rate.

SUMMARY OF THE INVENTION

In accordance with the objective stated above and in a first aspect, there is provided a method of encoding a sequence of video frames to form a compressed video sequence, said compressed video sequence comprising frames encoded in at least a first compressed video frame format and a second compressed video frame format, said first compressed video frame format being a non-temporally predicted format and said second compressed video frame format being a temporally predicted format characterised in that the method comprises the steps of identifying a first indication associated with a first video frame that said first video frame should be encoded in said first compressed video frame format; associating said first indication with a second video frame; encoding said second video frame in said first compressed video frame format; defining a first set of video frames comprising N video frames occurring prior to said second video frame; encoding said first set of video frames in said second compressed video frame format; defining a second set of video frames comprising M video frames occurring after said second video frame; and encoding said second set of video frames in said second compressed video frame format.

According to a second aspect of the invention there is provided a video encoder for encoding a sequence of video frames to form a compressed video sequence, said compressed video sequence comprising frames encoded in at least a first compressed video frame format and a second compressed video frame format, said first compressed video frame format being a non-temporally predicted format and said second compressed video frame format being a temporally predicted format characterised in that the encoder comprises means for identifying a first indication associated with a first video frame that said first video frame should be encoded in said first compressed video frame format; means for associating said first indication with a second video frame; means for encoding said second video frame in said first compressed video frame format; means for defining a first set of video frames comprising N video frames occurring prior to said second video frame; means for encoding said first set of video frames in said second compressed video frame format; means for defining a second set of video frames comprising M video frames occurring after said second video frame; and means for encoding said second set of video frames in said second compressed video frame format.

According to a third aspect of the invention there is provided a video codec including a video encoder according to the second aspect of the invention.

According to a fourth aspect of the invention there is provided a multimedia content creation system including a video encoder according to the second aspect of the invention.

According to a fifth aspect of the invention there is provided a multimedia terminal including a video encoder according to the second aspect of the invention.

According to a sixth aspect of the invention there is provided a multimedia terminal according to the fifth aspect of the invention characterised in that the terminal is a radio telecommunications device.

According to a seventh aspect of the invention there is provided a method of decoding a compressed video sequence to form a sequence of decompressed video frames, said compressed video sequence comprising frames encoded in at least a first compressed video frame format and a second compressed video frame format, said first compressed video frame format being a non-temporally predicted format and said second compressed video frame format being a temporally predicted format characterised in that the method comprises the steps of identifying a first indication associated with a first video frame that said first video frame is encoded in said first compressed video frame format; decoding said first video frame; receiving a first set of N frames in said second compressed video frame format for inclusion in said decompressed video sequence prior to said first video frame; decoding said first set of N video frames; re-ordering the frames of the first set of frames in accordance with playback information associated with the frames of the first set; receiving a second set of M video frames in said second compressed video frame format for inclusion in said decompressed video sequence after said first video frame; and decoding said second set of video frames.

According to a eighth aspect of the invention there is provided a video decoder for decoding a compressed video sequence to form a sequence of decompressed video frames, said compressed video sequence comprising frames encoded in at least a first compressed video frame format and a second compressed video frame format, said first compressed video frame format being a non-temporally predicted format and said second compressed video frame format being a temporally predicted format characterised in that the decoder comprises means for identifying a first indication associated with a first video frame that said first video frame is encoded in said first compressed video frame format; means for decoding said first video frame;
means for receiving a first set of N frames in said second compressed video frame format for inclusion in said decompressed video sequence prior to said first video frame; means for decoding said first set of N video frames; means for ordering the frames of the first set of frame in accordance with playback information associated with the frames of the first set; means for receiving a second set of M video frames in said second compressed video frame format for inclusion in said decompressed video sequence after said first video frame; and means for decoding said second set of video frames.

According to a ninth aspect of the invention there is provided a video codec including a video decoder according to the eighth aspect of the invention.

According to a tenth aspect of the invention there is provided a multimedia content retrieval system including a video decoder according to the eighth aspect of the invention.

According to an eleventh aspect of the invention there is provided a multimedia terminal including a video decoder according to the eighth aspect of the invention.

According to a twelfth aspect of the invention there is provided a multimedia terminal according to the eleventh aspect of the invention characterised in that the terminal is a radio telecommunications device.

According to a thirteenth aspect of the invention there is provided a computer program for operating a computer as a video encoder for encoding a sequence of video frames to form a compressed video sequence, said compressed video sequence comprising frames encoded in at least a first compressed video frame format and a second compressed video frame format, said first compressed video frame format being a non-temporally predicted format and said second compressed video frame format being a temporally predicted format characterised in that said computer program comprises computer executable code for identifying a first indication associated with a first video frame that said first video frame should be encoded in said first compressed video frame format; computer executable code for associating said first indication with a second video frame; computer executable code for encoding said second video frame in said first compressed video frame format; computer executable code for defining a first set of video frames comprising N video frames occurring prior to said second video frame; computer executable code for encoding said first set of video frames in said second compressed video frame format; computer executable code for defining a second set of video frames comprising M video frames occurring after said second video frame; and computer executable code for encoding said second set of video frames in said second compressed video frame format.

According to a fourteenth aspect of the invention there is provided a computer program for operating a computer as a video decoder for decoding a compressed video sequence to form a sequence of decompressed video frames, said compressed video sequence comprising frames encoded in at least a first compressed video frame format and a second compressed video frame format, said first compressed video frame format being a non-temporally predicted format and said second compressed video frame format being a temporally predicted format characterised in that said computer program comprises computer executable code for identifying a first indication associated with a first video frame that said first video frame is encoded in said first compressed video frame format; computer executable code for decoding said first video frame; computer executable code for receiving a first set of N frames in said second compressed video frame format for inclusion in said decompressed video sequence prior to said first video frame; computer executable code for decoding said first set of N video frames; computer executable code for ordering the frames of the first set of frame in accordance with playback information associated with the frames of the first set; computer executable code for receiving a second set of M video frames in said second compressed video frame format for inclusion in said decompressed video sequence after said first video frame; and computer executable code for decoding said second set of video frames.

According to a fifteenth aspect of the invention there is provided a computer program according to the thirteenth and fourteenth aspects of the invention.

According to a further aspect of the invention, there is provided a storage medium comprising a computer program for operating a computer as a video encoder for encoding a sequence of video frames to form a compressed video sequence, said compressed video sequence comprising frames encoded in at least a first compressed video frame format and a second compressed video frame format, said first compressed video frame format being a non-temporally predicted format and said second compressed video frame format being a temporally predicted format characterised in that said storage medium comprises:

computer executable code for identifying a first indication associated with a first video frame that said first video frame should be encoded in said first compressed video frame format;
computer executable code for associating said first indication with a second video frame;
computer executable code for encoding said second video frame in said first compressed video frame format;
computer executable code for defining a first set of video frames comprising N video frames occurring prior to said second video frame;
computer executable code for encoding said first set of video frames in said second compressed video frame format;
computer executable code for defining a second set of video frames comprising M video frames occurring after said second video frame;
computer executable code for encoding said second set of video frames in said second compressed video frame format.

According to a further aspect of the invention, there is provided a storage medium comprising a computer program for operating a computer as a video decoder for decoding a compressed video sequence to form a sequence of decompressed video frames, said compressed video sequence comprising frames encoded in at least a first compressed video frame format and a second compressed video frame format, said first compressed video frame format being a non-temporally predicted format and said second compressed video frame format being a temporally predicted format characterised in that said storage medium comprises:

computer executable code for identifying a first indication associated with a first video frame that said first video frame is encoded in said first compressed video frame format;
computer executable code for decoding said first video frame
computer executable code for receiving a first set of N frames in said second compressed video frame format for inclusion in said decompressed video sequence prior to said first video frame;
computer executable code for decoding said first set of N video frames;
computer executable code for ordering the frames of the first set of frame in accordance with playback information associated with the frames of the first set;
computer executable code for receiving a second set of M video frames in said second compressed video frame format for inclusion in said decompressed video sequence after said first video frame;
computer executable code for decoding said second set of video frames.

According to a further aspect of the invention, there is provided a method of encoding a sequence of video frames to form a compressed video sequence, said compressed video sequence comprising frames encoded in at least a first compressed video frame format and a second compressed video frame format, said first compressed video frame format being a non-temporally predicted format and said second compressed video frame format being a temporally predicted format characterised in that the method comprises the steps of:

identifying a first indication associated with a first video frame that said first video frame should be encoded in said first compressed video frame format; and
associating said first indication with a second video frame in such a way as to reduce a prediction path length in said compressed video sequence.

The video encoding method according to the present invention provides an encoded video data stream with greater error resilience than video streams encoded using conventional methods. More specifically, the invention provides a video encoding/decoding system in which the effects of data loss that lead to corruption of temporally predicted images, propagate to a lesser extent than when using prior art video codecs. According to the invention, the corruption of temporally predicted frames is reduced by shortening prediction paths within video sequences. This is achieved by effectively delaying the insertion of an INTRA coded frame. This can be done, for example, after a periodic INTRA frame request, an INTRA frame update request from a remote terminal, or a scene cut. According to the invention, frames that conventionally would be encoded in INTRA format, such as those associated with periodic INTRA requests, INTRA update requests, or scene cuts, are not themselves coded in INTRA format. Instead, a frame occurring later in the video sequence is chosen for coding in INTRA format. Preferably, the frame actually coded in INTRA format (termed the 'actual' INTRA frame) is selected such that it lies approximately mid-way between periodic INTRA requests, INTRA frame requests, or scene cuts. Frames occurring prior to the actual INTRA frame are encoded using temporal prediction, in reverse order, starting from the actual INTRA frame, while those frames occurring after it are encoded using temporal prediction in the forward direction. According to a preferred embodiment of the invention, those frames predicted in reverse order are encoded in INTER (P-frame) format. In an alternative embodiment, backward prediction using frames encoded in B-frame format is used.

The present invention provides substantially improved error resilience compared with conventional video encoding methods, in which frames associated with periodic INTRA requests, INTRA frame update requests, or scene cuts are themselves encoded in INTRA format. Specifically, the percentage of frames lost due to transmission errors is significantly reduced when the method according to the invention is employed. Compared with conventional methods that seek to provide increased error resilience by reducing prediction path lengths, the present invention does not result in a significant increase in bit-rate.

The invention can be implemented, for example, in a multimedia retrieval system where video is streamed on top of an unreliable packet-based transport protocol such as UDP. It may also be implemented in real-time videotelephony applications. The invention is particularly suited to mobile applications where at least part of the communications link is formed by a radio channel. Because radio communications links tend to exhibit a comparatively high bit error rate and have a restricted bandwidth, the increased error resilience provided by the invention is especially advantageous, particularly as it does not introduce a significant increase in bit-rate.

It is further emphasised that the exact nature of the network, the type of connection and the transmission protocol is not significant for implementation of the invention. The network may include both fixed-line (PSTN) as well as mobile telecommunications networks (PLMN), in which at least part of the communications link is formed by a radio channel. Data transmission in the network may be entirely packet-based, entirely circuit switched, or may include both circuit switched and packet switched data transmission. For example, the network may include some elements (e.g. a core network) employing packet-based data transmission coupled to other network elements in which circuit switched data transmission is used. An example of this kind of system is the currently proposed UMTS $3^{rd}$ generation mobile telephony network, in which at least part of the network may rely on circuit switched transmission.

The exact nature of the transmission errors affecting the data stream is also irrelevant to the application of the present invention. Furthermore, the encoding, decoding and playback methods according to the invention can be applied to pre-stored on-demand video as well as live (real-time) video compression. It should also be emphasised that the invention may be used either independently or in conjunction with prior art error correction, concealment and resilience methods including conventional methods for shortening prediction paths in video sequences, such as those mentioned above.

BRIEF DESCRIPTION OF THE DRAWINGS

The invention will now be described, by way of example only, with reference to the accompanying drawings, in which.

DETAILED DESCRIPTION OF THE INVENTION

Figure 1:
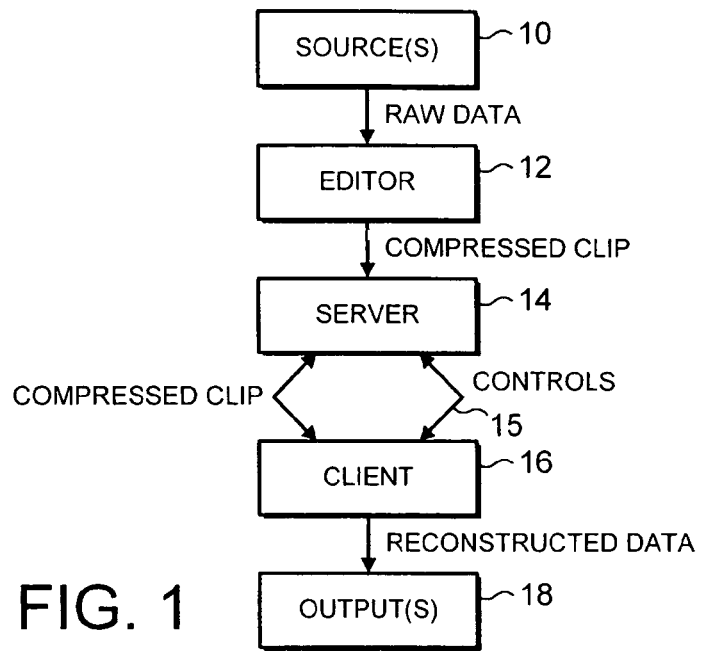
FIG. 1 illustrates a multimedia content creation and retrieval system according to prior art.
Figure 2:
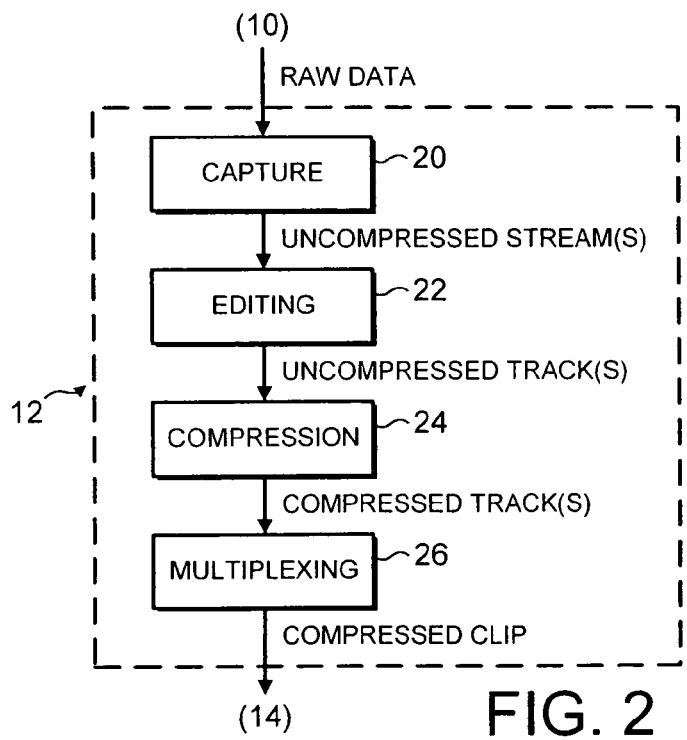
FIG. 2 shows the operations performed by a typical multimedia clip editor.
Figure 3:
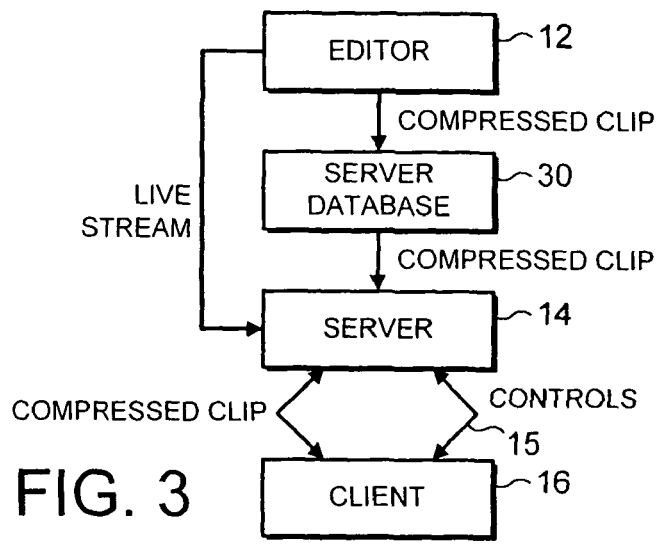
FIG. 3 shows the inputs and outputs of a typical multimedia server.
Figure 4:
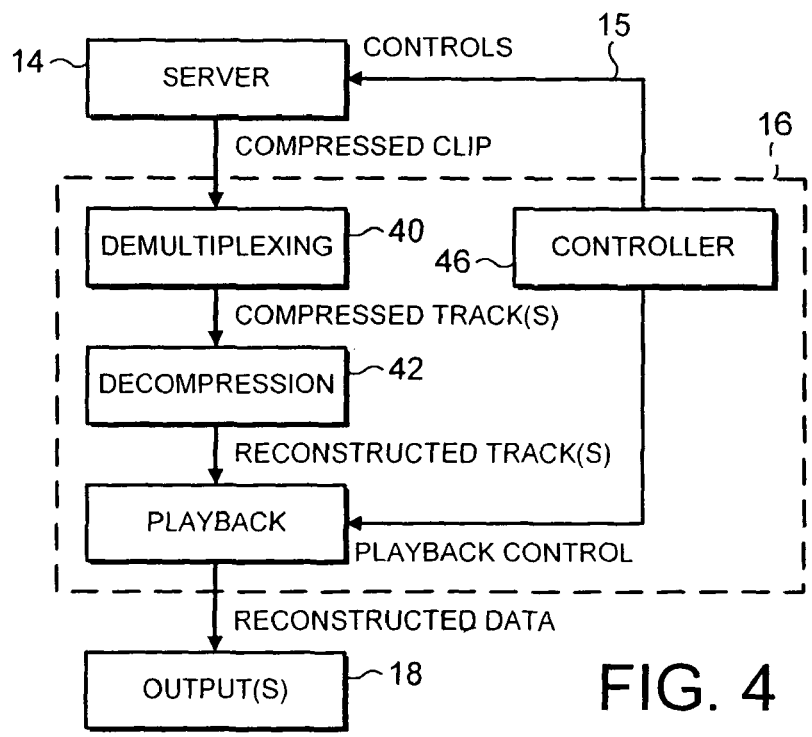
FIG. 4 illustrates the operations performed by a typical client terminal during retrieval of a multimedia clip.
Figure 5:
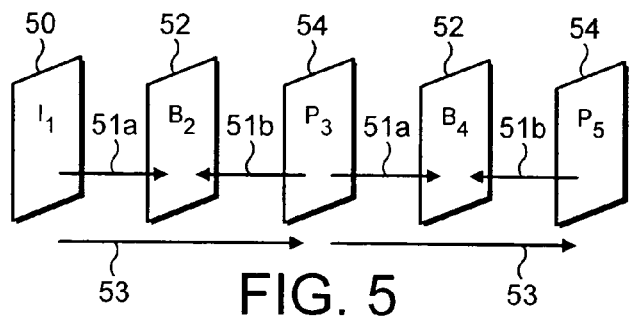
FIG. 5 illustrates the prediction dependencies between I, P and B frames in a compressed video sequence.
Figure 6:
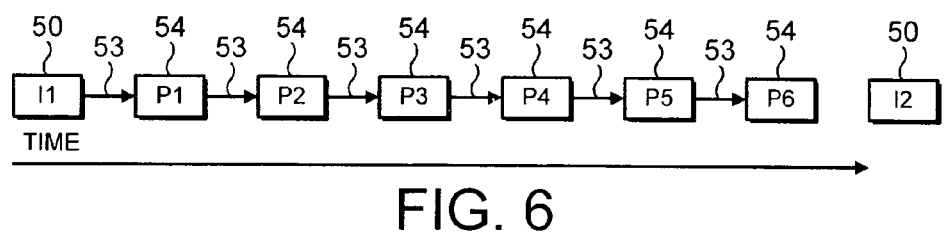
FIG. 6 shows an example video sequence employing INTER frame coding.
Figure 7:
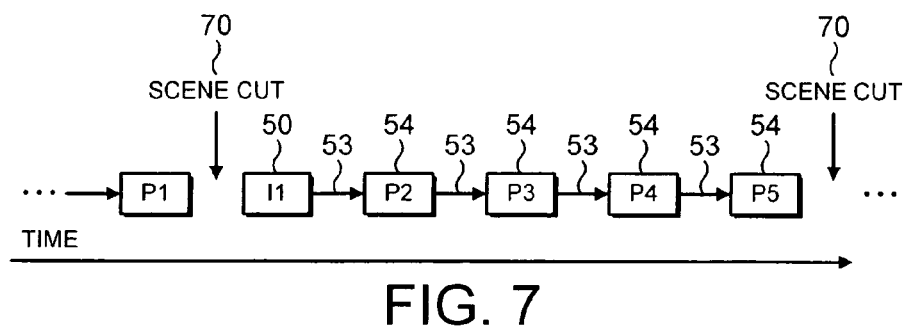
FIG. 7 shows insertion of an INTRA frame into a sequence of video frames immediately after a scene cut.
Figure 8:
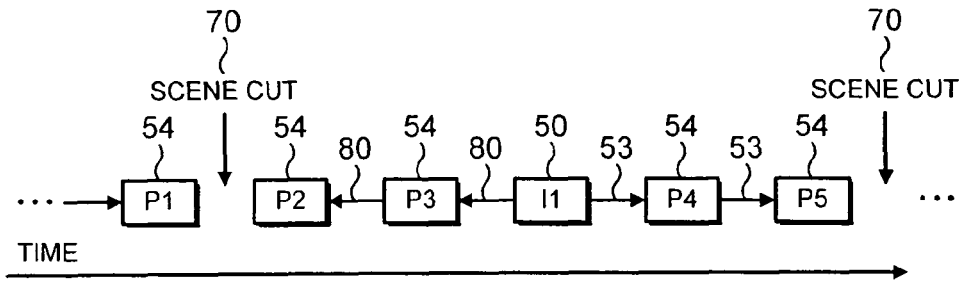
FIG. 8 illustrates an example of a video sequence produced by a video encoding method according to the invention.

In order to gain a better understanding of the invention and the advantages it provides, a preferred embodiment of a video encoding method according to the invention will be described by example and by comparing FIGS. 7 and 8. FIG. 7 illustrates a compressed video sequence arranged in a conventional manner, while FIG. 8 illustrates a compressed video sequence, constructed according to the method of the invention. Both sequences represent the same image content and comprise a few consecutive frames of video forming part of a longer sequence. As before, frames coded in INTRA format are labelled generically using the reference number 50, and INTER frames are referred to by the number 54. The forward prediction process by which INTER frames are constructed is labelled 53, according to the previously used convention. At the beginning of both sequences there is a scene cut 70. While the following description concentrates on application of the method according to the invention in connection with a scene cut in a video sequence, it should be appreciated that the invention may be applied equally well in any situation which would conventionally lead to the encoding of a frame in INTRA format including, but not limited to, scene cuts, INTRA frame requests from a remote terminal, or periodic INTRA frame refresh operations.

The series of frames shown in FIG. 7 represents a conventional encoding scheme in which an INTRA frame 50 is inserted into the sequence immediately after a scene cut 70. When a scene cut occurs, the subsequent image content is substantially different from that preceding the cut. Therefore, it is either impossible or impractical to code the frame immediately after the scene cut as an INTER frame, forward predicted from the previous frame. Thus, according to this conventional encoding scheme, an INTRA frame 50 (I1) is inserted immediately after the scene cut. Subsequent frames are then forward predicted (INTER coded) from that INTRA frame until e.g. the next scene cut, periodic INTRA request, or INTRA frame update request (70) occurs.

As explained earlier, the method according to the invention is based on delaying insertion of an INTRA frame, as illustrated in FIG. 8. According to the invention, an INTRA frame is not inserted into the video stream immediately, but instead a frame occurring later in the video sequence is chosen to be encoded in INTRA format. That frame is denoted as I1 in FIG. 8. As can be seen from FIG. 8, the frames between scene cut 70 and I1 (labelled P2 and P3 in FIG. 8) are predicted as INTER frames in reverse order from I1, as indicated by arrows 80. Consequently, they cannot be decoded before I1 is decoded, as I1 needs to be reconstructed before decoding of the preceding image content can be undertaken. This means that the initial buffering delay required during playback of the video sequence in accordance with the method of the invention should be typically greater than the time between the scene cut and the following INTRA frame.

The main benefit of a method according to the invention can be demonstrated by considering how many frames must be successfully transmitted in order to enable decoding of INTER frame P5. Using the conventional frame-ordering scheme illustrated in FIG. 7, successful decoding of P5 requires that I1, P2, P3, P4 and P5 are transmitted and decoded correctly. Thus, data loss (e.g. a packet loss) early in the sequence, for example in frame I1, will cause errors in the decoded picture content that will be propagated through the sequence as far as frame P5. In the method according to the invention, successful decoding of P5 only requires that I1, P4 and P5 are transmitted and decoded correctly. In other words, by using the method according to the invention, the prediction path in the image sequence is effectively reduced and consequently the likelihood that frame P5 will be correctly decoded is increased. Furthermore, the temporal propagation of errors within the sequence is reduced. Data loss early in the sequence, for example, in frame P2, will only cause errors in the decoded picture content of frame P2 and P3.

Figure 9:
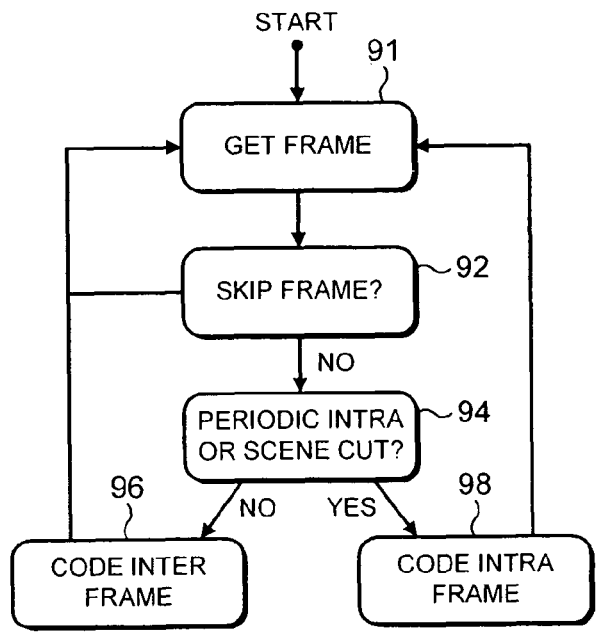
FIG. 9 is a flow chart illustrating the operation of a video encoder according to the prior art.

The video encoding method according to the invention will now be described in detail. The function of a video encoder implemented according to the method of the invention will be compared and contrasted with the operation of a conventional video encoder, whose operational structure 90 is presented in FIG. 9.

In the prior art video encoder 90, an uncoded raw picture is first handed to the encoder from a video source, such as a video camera coupled to a frame grabber, or a storage device, such as a computer hard drive where raw video frames are stored. Alternatively, the encoder may request a new frame to compress, by issuing a control command to the video source or storage device. This process of acquiring a new video frame for compression is illustrated in step 91 of FIG. 9. The rate at which uncoded frames are delivered to the encoder may be fixed or may vary.

Typically, the bit-rate of a video sequence may be reduced by skipping frames i.e. by omitting them from the video sequence. The decision as to whether a particular frame should be coded or not is made by the bit-rate control algorithm of the video encoder. This process is represented by step 92 in FIG. 9. If the bit-rate control logic determines that a given frame is to be coded, a conventional video encoder next decides the mode in which to encode the frame. This decision making process is represented by step 94. In the case that a periodic INTRA refresh has been requested, an INTRA frame update request has been received from a remote terminal, or a scene cut has occurred, the frame is coded in INTRA format, as illustrated by step 98. Otherwise, the frame is coded in INTER frame format, step 96. For ease of understanding, this description has been somewhat simplified and the handling of other frame types i.e. bi-directionally predicted B frames is not considered here. However, this simplification is not significant in terms of understanding the operation of an encoder according to the prior art.

Figure 10:
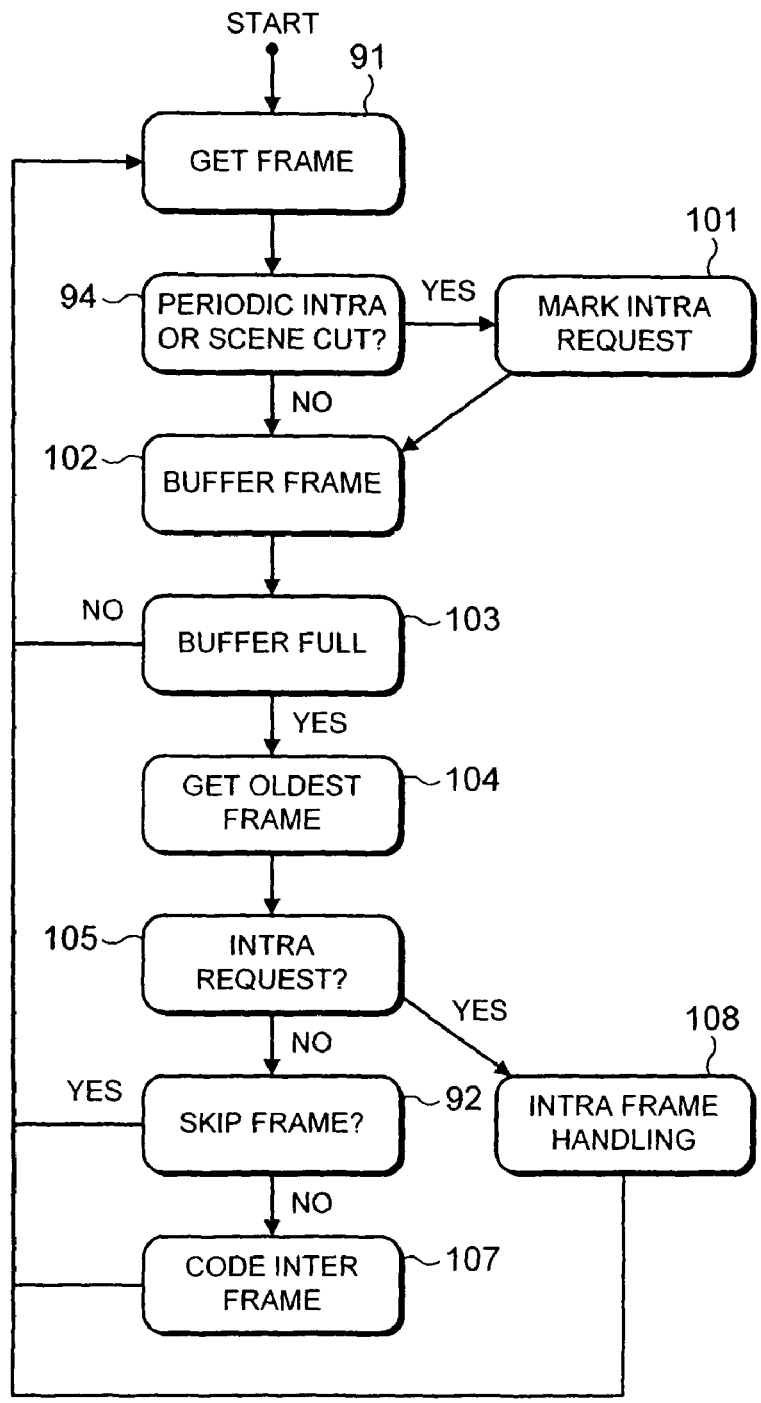
FIG. 10 is a flow chart illustrating a video encoding method according to a preferred embodiment of the invention.

For comparison, the procedural elements of a video encoding method according to the invention are illustrated in FIG. 10. Elements of the new method that perform functions equivalent to the prior art video encoder described above are denoted by the same reference numbers as used in connection with FIG. 9.

At first, an uncoded raw video frame is handed to the encoder, or the encoder may request a new frame to compress. This is represented by step 91 in FIG. 10. The encoder next determines (step 94) whether the image content should be coded in INTRA format, e.g. as a result of a scene cut, expiration of a periodic INTRA frame refresh interval, or receipt of an INTRA frame update request from a remote terminal. According to the invention, if the encoder determines that an INTRA frame is required for any reason, it makes a record that such an INTRA frame is needed, as shown in FIG. 10, step 101. Such a record indicating the need for an INTRA frame, may be made, for example, by setting a flag for the frame and storing the flag in a frame buffer. The way in which a request for an INTRA frame is indicated is described in further detail below, although it should be appreciated that the exact way in which an INTRA request is indicated is not significant for application of the invention. The frame is then buffered (102).

The encoder according to the invention maintains a buffer that is used to store raw image data prior to compression. Advantageously, the buffer is sufficiently large to contain a number of raw image frames corresponding to a time period (T). Some so-called 'meta' data is associated with each frame of image data. The meta data provides information about the frames to be coded and can include the indication of an INTRA frame request, as described above, if such a request is made. For frames to be coded in INTER format, the meta data can include the number of the reference frame to be used for motion compensation (if the reference frame is not the previously coded frame). The meta data for all frames contains a compression order number CO, indicating the order in which the uncompressed video frames are to be encoded. Each incoming frame is stored in the buffer.

Initially, before encoding has commenced, the buffer is empty. When encoding starts, the buffer is filled (102) until it contains a number of frames corresponding to time period T. The buffer is monitored to determine when it becomes full (step 103). When the buffer is full, the 'oldest' frame is removed from the buffer i.e. that which was first loaded into the buffer. This operation is represented by step 104 in FIG. 10. The encoder determines if the frame in question is associated with an INTRA frame request (step 105) e.g. by examining the frame's corresponding meta data and determining whether an INTRA request flag is set. If the frame is not associated with an INTRA request, the bit-rate control algorithm of the encoder decides whether the frame should be skipped (step 92) or whether to code the frame as an INTER frame (step 107). If a frame is skipped and it contains an indication that a frame other than the previous frame should be used as a reference for motion compensation, that indication is copied to the meta data describing the next frame in the buffer. If a decision is made not to skip the frame, it is coded in INTER format (step 107), using either the previous frame in the sequence as a reference, or that indicated as the motion compensation reference by the meta data.

Figure 11:
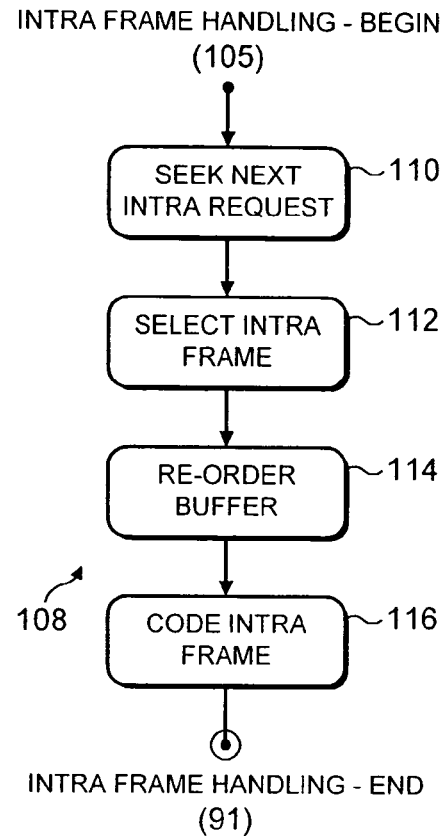
FIG. 11 is a flow chart illustrating the handling of INTRA frames according to the method of the invention.

If the frame retrieved from the buffer is associated with an INTRA frame request, an INTRA frame handling procedure, denoted in general by the reference number 108, is executed. FIG. 11 presents the procedural elements of step 108 in detail. The current INTRA frame request occurs at time T1. The first step in the INTRA frame handling procedure is to search the frame buffer to locate the next INTRA frame request i.e. the INTRA frame request following that currently being processed. This is illustrated by step 110 in FIG. 11. The time of occurrence T2 of the next INTRA request is determined from its associated meta data. Next, the actual frame to be coded in INTRA format is determined such that the time difference from the two requested INTRA frames is approximately equal. In other words, if the current INTRA request is associated with a frame whose time of occurrence is T1, a frame is selected from the buffer whose time of occurrence T3, such that T3−T1 is approximately equal to T2−T3. This newly located frame is selected for coding in INTRA format. The process just described is denoted by reference number 112 in FIG. 11. It should be noted that according to the invention, the frame that is actually coded in INTRA format (hereinafter referred to as the 'actual' INTRA frame) is not that associated with the initial INTRA coding request, but generally some other frame that occurs later in the video sequence. If the buffer does not contain another frame associated with an INTRA frame request, the actual frame to be coded in INTRA format is selected so that the time difference between its time of occurrence T3 and the INTRA request at time T1 is approximately equal to the time difference between T3 and the last frame of the buffer.

Next, at step 114, the actual frame to be coded in INTRA format is removed from the buffer and the order of the frames preceding the actual INTRA frame is reversed. The frame immediately preceding the actual INTRA frame and that immediately after are marked so that they contain an indication that the actual INTRA frame should be used as a reference for motion compensation. Finally, the frame selected for coding in INTRA format is coded as an INTRA frame (step 116) and the remaining frames up to but not including the frame corresponding to T2 are encoded using motion compensated temporal predictive coding. Those frames occurring prior to the actual INTRA frame are encoded in reverse order, starting from the actual INTRA frame, while those frames occurring after it are encoded in the forward direction. It should be appreciated that reversing the order of the frames preceding the actual INTRA frame does not necessarily require physical re-ordering of the buffer. As will be described in further detail below, effective reversal of frames within the buffer can be achieved using the compression order (CO) numbers assigned to each frame.

In order to gain a fuller understanding of the INTRA frame handling procedure described above, it is advantageous to consider an example. Here it is assumed that the video encoder of a video capture and retrieval system has been designed to implement the method according to the invention. The encoder includes a buffer capable of storing five seconds (plus one frame) of video data in uncompressed format. The encoder is supplied with uncompressed (i.e. raw) video frames by a video frame source, at a constant rate of 25 frames per second and thus the time difference between consecutive frames is consistently 40 milliseconds. At an arbitrary time instant within the sequence, the contents of the buffer are as shown in Table 1:

TABLE 1

Example of contents of Video Encoder Buffer

| | Playback/Capture Time | | | | |
|---|---|---|---|---|---|
| | t + 0 | t + 40 | t + 80 | ... T + 4960 | t + 5000 |
| Compression Order Metadata | Not Available INTRA request | Not Available | Not Available | ... Not Available | Not Available INTRA request |

In Table 1, the playback/capture time of a given raw video frame is indicated in milliseconds with reference to time t. As described above, meta data is used to store additional information about the uncompressed video frames, including the compression order number (CO) which is used to indicate the order in which the frames are to be compressed and decompressed.

In the particular video sequence considered in this example, there are no scene cuts, but rather a periodic INTRA refresh is requested every 5 seconds. Associated INTRA frame request indications are present in the meta data provided with each uncompressed video frame. As can be seen from Table 1, for the purposes of this example, it is assumed that an initial INTRA request occurs at time t. As INTRA requests are made every 5 seconds, the next such request will occur at t+5000 ms. The meta data provided with the uncompressed video frames enables the encoder to determine when INTRA requests are made.

Using the method according to the invention, the encoder does not apply INTRA coding to the frames directly associated with INTRA requests, but selects a frame to be coded in INTRA format approximately half way in time between the current INTRA request and the following INTRA request. It should be appreciated that it is not necessarily possible to select a frame exactly equidistant between consecutive INTRA requests, as this depends on the time interval between successive INTRA requests and the frame rate of the video sequence. In the example given here, where the frames are separated by 40 ms and INTRA requests occur at regular 5000 ms intervals, the most appropriate frames to be coded in INTRA format, according to the invention, are those which occur at t+2480 ms or t+2520 ms (see Table 1). Thus, the encoder can select either the frame that occurs at t+2480 or that which occurs at t+2520 ms to be the actual INTRA frame. Either of these two frames may be considered an equally appropriate choice for coding in INTRA format. The criterion used to decide the choice of actual INTRA frame may vary according to the implementation of the method, but in this case it is assumed that the frame occurring at t+2480 ms is chosen as the actual INTRA frame.

Advantageously, the encoder next assigns compression order (CO) numbers to the uncompressed frames in the buffer. All frames in the buffer are labelled with compression order numbers that refer to the actual INTRA frame i.e. that frame previously chosen to be coded in INTRA format. Preferably, this compression order information is stored in the meta data associated with each frame, as shown in Table 2.

TABLE 2

Contents of Example Video Buffer After Allocation of Compression order Numbers and Reference Picture Selection.

| | Playback/Capture Time | | | | | | | |
|---|---|---|---|---|---|---|---|---|
| | t + 0 | t + 40 | t + 80 | ... t + 2440 | t + 2480 | t + 2520 | ... t + 4960 | t + 5000 |
| Compression Order Metadata | CO = 62 | CO = 61 | CO = 60 | ... CO = 1 | CO = 0 Actual INTRA | CO = 63 Reference picture CO = 0 | ... CO = 124 | NA INTRA request |

Uncompressed frames preceding the actual INTRA frame in the encoder's buffer are given compression order numbers sequentially such that frames occurring earlier in the buffer receive larger compression order numbers. The actual INTRA frame is given the compression order number CO=0. Thus, in the example considered here, the frame immediately preceding the actual INTRA frame (i.e. that which occurs at t+2440 ms) is given compression order number CO=1. The frame before that receives compression order number CO=2, the one before that is given the compression order number CO=3 and so on. In the example considered here, this labelling scheme results in the first frame in the buffer receiving a compression order number of CO=62. It will be apparent to one of ordinary skill in the art that this labelling scheme effectively indicates that frames preceding the actual INTRA frame should be predicted in reverse order from the actual INTRA frame and not forward predicted from the frame that was associated with the initial INTRA request (i.e. that occurring at time t).

The compression order number of the frame immediately following the actual INTRA frame (i.e. that occurring at t+2520 ms), and the compression order numbers of subsequent frames, follow in sequence from the compression order number of the earliest frame in the sequence preceding the actual INTRA frame. Thus, in the example considered here, the uncompressed video frame occurring immediately after dom (i.e. the buffer is a random access buffer), then frames can be selected directly for encoding in the order indicated by the compression order numbers and no physical re-ordering is required. If, on the other hand, as assumed in this example, it is easier to access the buffer in a first-in-first-out (FIFO) manner, physical re-ordering of the frames according to compression order number is beneficial.

The actual INTRA frame may be encoded using any suitable method. The exact choice of encoding method may depend, for example, on the characteristics of the communication channel that will be used for subsequent transmission of the compressed video data. The available bit-rate is one possible criterion that could dictate the choice of encoding method. For example, in a fixed line video retrieval or videotelephony system, it might be appropriate to encode the selected (actual) INTRA frame according to ITU-T recommendation H.261, which is designed specifically to provide optimum performance in communications systems with an available bit-rate of p×64 kbits/s. Alternatively, if the video data is to be included in a multimedia bit-stream, encoding according to the MPEG4 standard might be more appropriate. In very low bit-rate communications and particularly over radio communications channels, ITU-T recommendation H.263 is another alternative video coding scheme.

After the re-ordering operation described above, the contents of the buffer are as shown in Table 3:

TABLE 3

Contents of Example Video Buffer After Re-Ordering

| | Playback/Capture Time | | | | | | | |
|---|---|---|---|---|---|---|---|---|
| | t + 2440 | t + 2400 | t + 2360 | ... t + 0 | t + 2520 | t + 2560 | ... t + 4960 | t + 5000 |
| Compression Order | CO = 1 | CO = 2 | CO = 3 | ... CO = 62 | CO = 63 | CO = 64 | ... CO = 124 | NA |
| Metadata | | | | | Reference picture CO = 0 | | | INTRA request | the actual INTRA frame in the encoder's frame buffer is given the compression order number CO=63, the frame following that receives the compression order number CO=64, the next frame is given the compression order number CO=65 and so on. Furthermore, according to the method of the invention, the frame immediately following the actual INTRA frame is labelled in such a way that its reference picture (the frame from which it is to be predicted) is not the frame with the previous compression order number, but the actual INTRA frame with compression order number CO=0. Advantageously, this indication is included in the meta data associated with the frame occurring immediately after the actual INTRA frame. In the example presented here, this means that the frame residing immediately after the actual INTRA frame, having compression order number CO=63, is not predicted from the frame with compression order number CO=62, but from the actual INTRA frame itself, which has compression order number CO=0.

The contents of the video buffer, after the allocation of compression order numbers, is as shown in Table 2.

The encoder next removes the actual INTRA frame from the buffer, re-orders the buffer according to the previously assigned compression order numbers and codes the selected (i.e. actual) INTRA frame.

It is emphasised that the requirement for physical re-ordering of the buffer is dependent on the type of buffer used. If the encoder can search the buffer and access its contents at ran- The remaining frames in the buffer (except for the frame corresponding to t+5000) are coded in INTER format, the sequence in which frames are predicted one from another being determined by their compression order number and the information concerning reference picture selection provided in the associated meta data. Again, the exact details of the INTER coding used are not significant for application of the method according to the invention. Because the order in which the video frames are encoded is determined by their assigned compression order numbers, the encoding process now proceeds as follows. Frames with compression order numbers CO=1 to CO=62 are predicted in sequence, one from the other, starting from the actual INTRA frame (compression order CO=0). In other words, the frame with compression order number CO=1 is INTER coded using the actual INTRA frame as a reference picture, the frame with compression order number CO=2 is predicted from the decoded INTER coded frame whose compression order number is CO=1 and so on. This process appears to be forward predictive. However, due to the fact that the uncompressed frames were given compression order numbers in reverse order, frames CO=1 to CO=62 are effectively predicted in reverse order from the actual INTRA frame.

This process continues until the frame with compression order number CO=63 is reached. This frame should be coded in INTER format, forward predicted from the actual INTRA frame (CO=0) and should not be predicted from frame CO=62. In the method according to the invention this is indicated in the meta data associated with frame CO=63. The meta data indicates that the compression order number of the reference picture to be used in the INTER predictive coding of frame CO=63 is CO=0, the actual INTRA frame. Once the prediction origin has been reset to frame CO=0, the encoder continues encoding the remaining uncompressed video frames in the buffer (those with compression order numbers CO=63 to CO=124) in sequence, one from the other. In other words, frame CO=63 is coded in INTER format using frame CO=0 (i.e. the actual INTRA frame) as its reference picture, frame CO=64 is predicted from CO=63, frame CO=65 is predicted from frame CO=64 and so on.

In the preceding description, the video encoding method according to the invention was described using an example in which the video sequence was encoded on the basis of principally two types of video frame, non-temporally predicted INTRA frames and temporally predicted INTER frames. However, it should be apparent to one of ordinary skill in the art that the method may also be extended in such a way as to include the use of other kinds of video frame. Specifically, B pictures which employ temporal prediction in the forward, reverse or both forward and reverse directions may also be used in connection with the present invention. In other words, the actual INTRA frame or any of the INTER format frames predicted in reverse order form the actual INTRA frame may be used as anchor pictures for the construction of B pictures. The B pictures may be constructed using forward prediction, reverse prediction, or a combination of the two. Similarly, B pictures may also be included in the part of the sequence comprising INTER format frames forward predicted from the actual INTRA frame.

The process just described enables individual frames of video data to be encoded in a straightforward manner with reference to the selected (actual) INTRA frame. However, while encoding of video frames according to their assigned compression order number facilitates the encoding process, it may give rise to a problem when the frames are decoded. Specifically, the video frames may not be encoded in the correct order for playback. This can be appreciated by looking at the playback/capture times shown in Table 3. Thus, when the frames are encoded and subsequently transmitted over a communication channel to a decoder in this order, the decoder re-orders the frames according to their intended playback time to ensure that they are played back in the correct sequence.

This process will be described in more detail later in the text, but here it is noted that information is associated with each frame concerning its desired playback time at the decoder. This is transmitted to the decoder along with the picture data itself and the meta data including the compression order number for each frame. It should be noted that in certain packet switched networks, data packets may not arrive at the receiver in the same order in which they were transmitted. Some transmission protocols, such as RTP (Reliable Transmission Protocol), provide an indication of the order in which data packets are transmitted, so-called "sequence numbering". This enables data packets to be assembled into their correct order at the receiver. In this kind of system, it is strictly unnecessary to send the compression order number with the video data, because the order in which the video frames were encoded can be implied from the sequence numbering of the received data packets. However, in systems where no sequence numbering is provided by the transmission protocol, transmission of compression order information is necessary. Information about the scheduled playback time of each video frame can easily be incorporated into the file or multi-plexing/transmission format headers used when transmitting the video data over a communications link and may be included in the video coding format/syntax itself.

Figure 14:
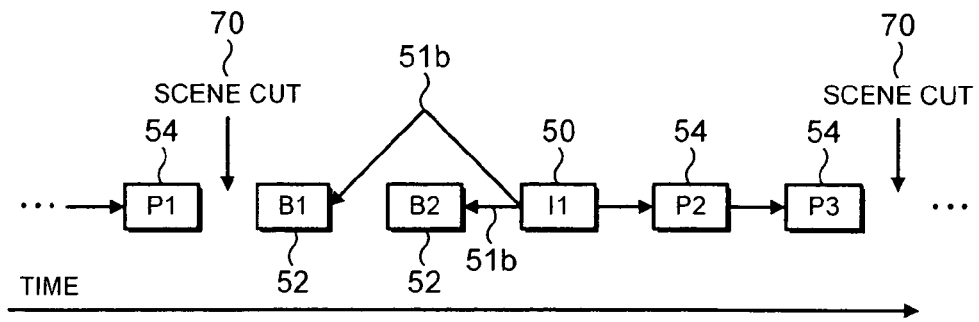
FIG. 14 illustrates the procedural steps of a video encoding method according to an alternative embodiment of the invention in which B frames are used.

Because the invention essentially delays the insertion of an INTRA frame after an INTRA request, it is also necessary for the backward predicted INTER frames to be displayed before the frame which is actually encoded in INTRA format. In an alternative embodiment of the method according to the invention, as illustrated in FIG. 14, B-frames may be used. This approach may be advantageous in situations where the compressed video syntax or the surrounding file or transmission format does not allow the playback of frames predicted in reverse order (e.g. INTER coded frames P2 and P3 in FIG. 8) before the following anchor frame (I1). Typically, as for example in ITU-T recommendation H.263, B-frames support backward, forward or bi-directional prediction. Thus, the encoding method according to the invention can be implemented using B-frames backward predicted from the following anchor frame (I1). However, this technique provides worse compression efficiency than the method previously described in the preferred embodiment of the invention.

Referring to FIG. 14, the encoding method according to this alternative embodiment of the invention proceeds in a similar manner to the preferred embodiment, as far as the point at which the actual INTRA frame has been selected. Frames preceding the actual INTRA frame in the encoder's buffer are then coded as B-frames 52, each B frame being backward predicted 51b directly from the actual INTRA frame, as shown in FIG. 14. As backward prediction of B-frames is already supported by video coding recommendations, such as ITU-T H.263, in this alternative embodiment it is not necessary to assign reverse ordered CO numbers to the frames preceding the actual INTRA frame. It is sufficient to indicate that each of the frames should be encoded in B-frame format using the actual INTRA frame as the prediction reference. This information can be included in the meta data associated with each frame preceding the actual INTRA frame. Those frames following the actual INTRA frame in the buffer are then coded in INTER format, one from the other. An indication that the actual INTRA frame is to be used as the prediction reference for the frame immediately following the actual INTRA frame is included in the meta data for that frame.

Another alternative embodiment of the method may be used in situations where the video compression method does not support reference picture selection. In this case, the layer (e.g. control program) controlling or calling the video codec may replace the contents of the codec's reference frame buffer with the actual INTRA frame at a time immediately prior to the instant it should be referenced. Referring to the example presented in detail above, this means that the reference frame buffer should be loaded with frame CO=0 when starting to encode or decode frame CO=63. In order to enable this alternative embodiment of the invention, the compressed video syntax, or multiplexing/transmission format should carry information identifying the actual INTRA frame and which of the frames requires it as a reference.

Figure 12:
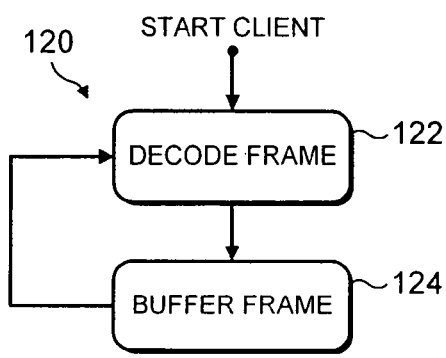
FIG. 12 is a flow chart illustrating the procedural steps of a video decoding method according to a preferred embodiment of the invention.

Next, exemplary embodiments of a decoding method and a video playback method suitable for use in conjunction with the video encoding method already presented will be described. A decoding method according to the invention is illustrated in FIG. 12. In the decoding process, the decoder receives encoded frames from the transmission channel and buffers (120) the frames. The decoder then decodes the buffered frames 122. In this context, the transmission channel may be any communication channel suitable for the transmission of compressed video or multimedia data. Transmission may take place through a fixed line network such as the Internet, ISDN or PSTN (Public Switched Telephone Network); alternatively at least part of the network may comprise a radio link, such as that provided by a PLMN (Public Land Mobile Network). The generic term 'transmission channel' should also be understood to include the transmission of data that takes place when stored files are retrieved from a storage medium e.g. from a computer hard drive for display or further processing.

Each frame of the compressed video sequence is decoded in an essentially standard manner, well known to those of ordinary skill in the art, according to the method in which it was encoded. This is possible because the method according to the invention does not necessarily make changes to the format of the INTRA and INTER coded frames themselves. Thus, encoding of individual uncompressed video frames may take place according to any appropriate scheme, standardised or proprietary, as explained above.

After decoding, the uncompressed frames are stored (124) in a playback buffer. If the length of the buffer used in the encoder is T (see the earlier description of the encoding phase) the buffer used in the decoder should advantageously be able to hold at least 0.5×T seconds of uncompressed video pictures. Next, the decompressed video frames are ordered into their correct playback sequence. The decoder orders the frames using the playback time information associated with each frame. As described above, this information may be incorporated into the data structure when storing the video frames in the buffer of the encoder and can be carried within the compressed video syntax or using the multiplexing/transmission format when transmitting the compressed video frames to the decoder. In some situations, for example when the throughput of the communications channel drops, the decoder may actually receive a frame after its scheduled playback time. If a frame is received after its scheduled playback time, or if it is received before its scheduled playback time but cannot be decoded quickly enough to ensure that it will be played back punctually, then such a frame may not be stored in the decoder's input buffer at all. However, it may be advantageous to store frames that arrive late, or cannot be decoded in time for their scheduled playback, as they can be used, for example, to improve error concealment for other frames.

Figure 13:
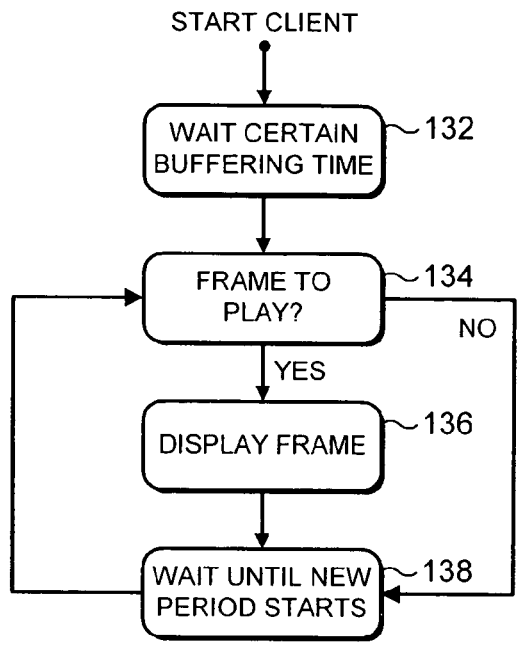
FIG. 13 is a flow chart illustrating operation of the method according to the invention during video playback.

The procedural steps of a video playback 'engine' according to an exemplary embodiment of the invention are presented in FIG. 13. The playback engine receives as its input decompressed video frames, correctly ordered according to their scheduled playback times, from the buffer 124 of the video decoder. When playback of a new video sequence begins, the incoming video frames are buffered in a playback buffer 132. In order to ensure playback of the video sequence without pauses, this initial buffering time should be at least 0.5×T seconds. After the initial buffering time, the playback process enters the normal playback loop, comprising steps 134, 136 and 138. The first step of the loop 134 determines whether there is a frame in the playback buffer scheduled to be played back. If such a frame exists, it is displayed 136. If such a frame does not exist, or if a frame has just been displayed, the process enters a periodic waiting or idle state 138. Advantageously, the operating rate of the playback loop is the (maximum) frame rate of the original captured sequence. For example, if a sequence is captured at a rate of 25 frames per second, the playback loop is executed every 40 milliseconds.

Figure 15:
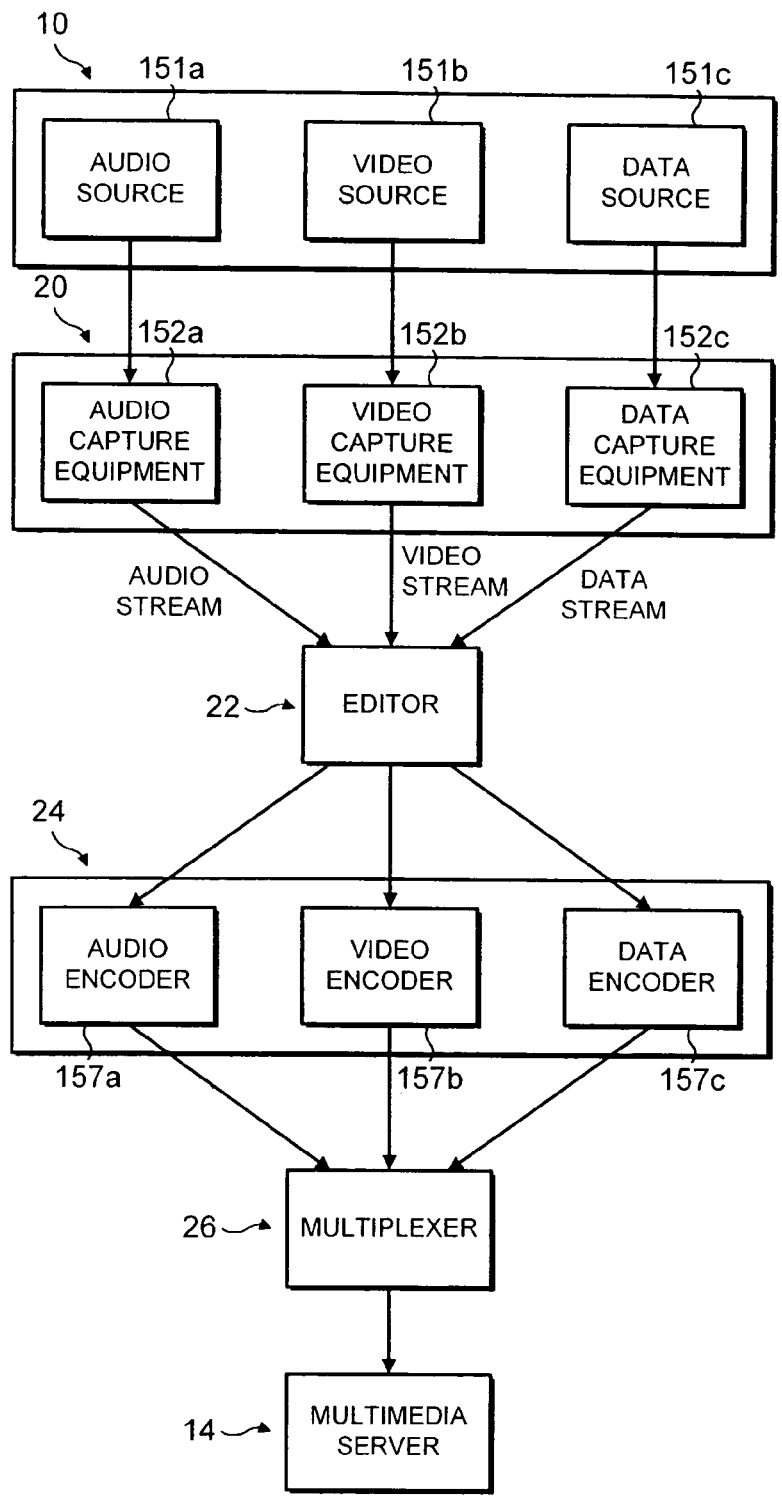
FIG. 15 presents a multimedia content creation and retrieval system incorporating a video encoder implemented according to the invention.

FIG. 15 presents an exemplary embodiment of a multimedia content creation system according to the invention. Here, the system is shown to include three media sources 10: an audio source 151*a*, a video source 151*b* and a data source, 151*b*. It will be apparent to a person of ordinary skill in the art that the number of media sources is not limited to the three examples presented here. It is also evident that each source may take a number of different forms, including but not limited to, sources of 'live' i.e. real-time media content and non real-time media sources, such as files of media content residing on a mass storage medium, e.g. a networked hard drive or the like.

The multimedia content creation system according to the invention includes multimedia capture means, denoted generically by the reference number 20. In the exemplary embodiment presented here, dedicated capture equipment is provided for each media source. Thus, the capture means 20 includes audio capture equipment 152*a*, video capture equipment 152*b* and data capture equipment 152*c*. The audio capture equipment may include, for example a microphone, analogue-to-digital converter and signal processing electronics to form frames of digitised audio data. The video capture equipment, as described previously, may include a video grabber card for producing digital video frames from an analogue video input. For each media source, the capture equipment may also include software such as dedicated device drivers and application programs necessary to control operation of the media sources and their associated capture equipment. The output of the multimedia capture means 20 is a set of uncompressed media streams, each stream corresponding to one of the media sources 151*a*-151*c*.

Alternatively, if one or more of the media sources provides its content in a form already suitable for application to the multimedia content editor 22, that media content may be applied directly to the editor. This may be the case, for example, when the media source is a file of e.g. audio or video frames retrieved in digital form from files stored on a mass storage medium.

The multimedia content editor 22 receives the separate media streams, provided by the multimedia capture means and links them together in a single time-line. For example, multimedia streams that should be played back synchronously, such as audio and video content, are linked by providing indications of each frame's desired playback time. Indications regarding the desired playback time of other multimedia streams may also be provided. Once linked in this way, each component of the multimedia content is referred to as a 'track'. The editor 22 may also provide a possibility to edit the media tracks in various ways. For example the video frame rate may be reduced to half or the spatial resolution of video images may be decreased.

From the editor 22, the media tracks are received by an encoding unit 24. In the exemplary embodiment presented here, each track is encoded independently in a manner appropriate for the media type in question and individual encoders are provided for each media type. Thus, in this example, three encoders are provided, an audio encoder 157*a*, a video encoder 157*b* and a data encoder 157*c*. Again it will be appreciated that the precise number of individual encoders is not significant for application of the method according to the invention. It should also be noted that in the case of the data encoder the encoding method may differ depending on the nature of the data. The respective encoders remove redundant information in each of the media tracks so that they are represented in a more compact form, suitable for e.g. transmission over a communications link having a limited bandwidth. The compression techniques used may include both lossless and lossy compression methods. The audio and data tracks may be encoded using any appropriate method, the choice of which may depend on the nature of the communications channel used to further transmit the multimedia data to a receiving client. For example, the audio track may be encoded using the GSM EFR speech codec. The video encoder 157b is implemented according to the method presented earlier in this text. It employs motion compensated temporal prediction and, as described earlier, operates in such a way as to reduce the prediction path used within image sequences according to the method of the invention, providing the compressed video track with greater resilience to errors resulting from data loss.

The compressed media tracks created by the encoding unit 24 are received by a multiplexer 26. Here they are interleaved so that they form a single bit-stream, referred to as a multimedia 'clip'. The clip is then handed over to multimedia server 14, form where it may be transmitted further over a communications link to a receiving client.

Figure 16:
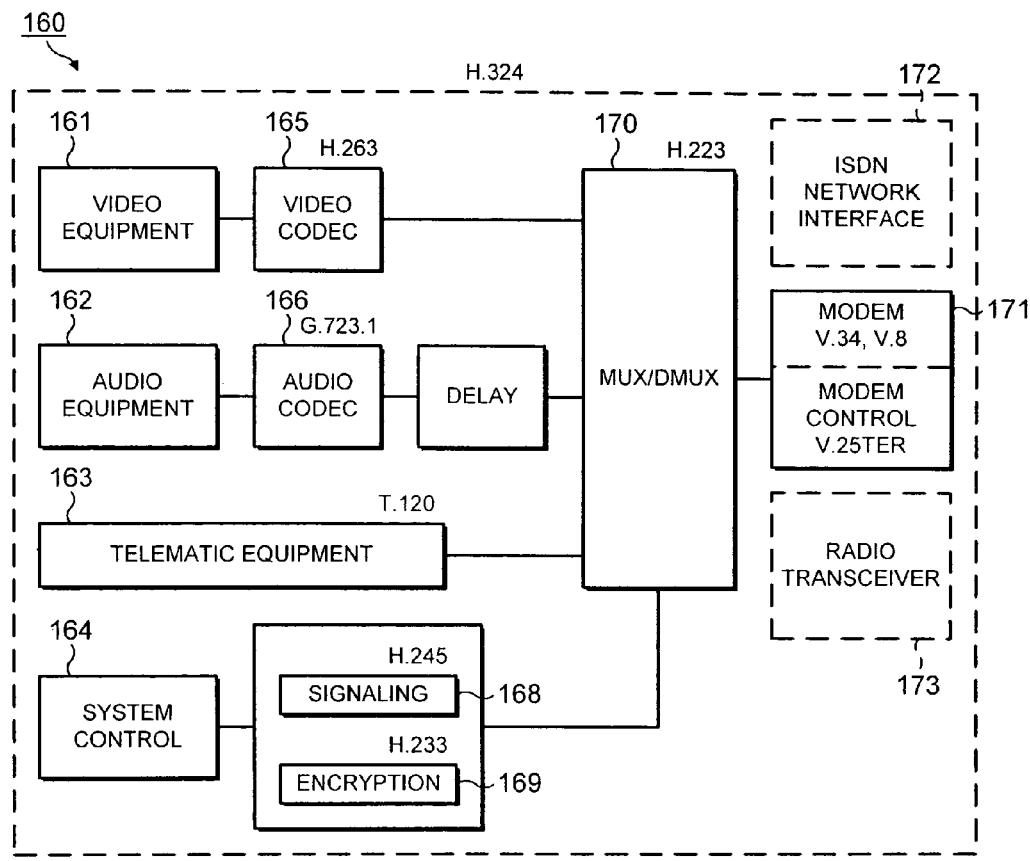
FIG. 16 is a block diagram of a generic H.324 multimedia terminal including a video codec comprising a video encoder and a video decoder, adapted to implement the video encoding and decoding methods according to the invention.

FIG. 16 presents an alternative situation in which the method according to the invention can be adopted. The figure illustrates a multimedia terminal 160 implemented according to ITU-T recommendation H.324. The terminal can be regarded as a multimedia transceiver device. It includes elements that capture, encode and multiplex multimedia data streams for transmission via a communications network, as well as elements that receive, demultiplex, decode and playback received multimedia content. ITU-T recommendation H.324 defines the operation of the terminal as a whole and refers to other recommendations that govern the operation of the various elements of the terminal equipment. Typically, such a multimedia terminal is used in real-time multimedia applications such as videotelephony, although its use is by no means limited to that application. For example, an H.324 multimedia terminal may also be used as a multimedia content retrieval client to download or stream multimedia content from e.g. a multimedia content server.

In the context of the present invention, it should be appreciated that the H.324 terminal shown in FIG. 16 is only one of a number of alternative multimedia terminal implementations suited to application of the inventive method. It should also be noted that a number of alternatives exist relating to the location and implementation of the terminal equipment. As illustrated in FIG. 16, the multimedia terminal may be located in communications equipment connected to a fixed line telephone network such as an analogue PSTN (Public Switched Telephone Network). In this case the multimedia terminal is equipped with a modem 171, compliant with ITU-T recommendations V.8, V.34 and optionally V.8bis. Alternatively, the multimedia terminal may be connected to an external modem. The modem enables conversion of the multiplexed digital data and control signals produced by the multimedia terminal into an analogue form suitable for transmission over the PSTN. It further enables the multimedia terminal to receive data and control signals in analogue form from the PSTN and converts them into a digital data stream that can be demultiplexed and processed in an appropriate manner by the terminal.

An H.324 multimedia terminal may also be implemented in such a way that it can be connected directly to a digital fixed line network, such as an ISDN (Integrated Services Digital Network). In this case the terminal is implemented according to H.324/I (Annex D of ITU-T recommendation H.324) and the modem 171 is replaced with an ISDN user-network interface according to the ITU-T I.400 series of recommendations. In FIG. 16, this ISDN user-network interface is represented by block 172.

H.324 multimedia terminals may also be adapted for use in mobile communication applications. Annex C of recommendation H.324 presents a number of modifications that adapt an H.324 terminal for use in error-prone transmission environments. Most of these modifications apply specifically to the multiplexing protocol used to combine data streams (ITU-T recommendation H.223) and are intended to produce a bit-stream that is more robust to data loss and corruption due to channel errors. While the use of these modifications is not restricted to mobile communications, they are particularly suitable for use in mobile applications due to the comparatively high bit-error rates typically experienced in this kind of communication link. H.324 Annex C also states (paragraph C.3) that in mobile applications, the modem 171 can be replaced with any appropriate wireless interface, as represented by block 173 in FIG. 16. Thus, a mobile multimedia terminal implemented according to H.324 Annex C (commonly referred to as an H.324/M terminal) can incorporate a radio part suitable for use in any current or future mobile telecommunication network. For example, an H.324/M multimedia terminal can include a radio transceiver enabling connection to the current $2^{nd}$ generation GSM mobile telephone network, or the proposed $3^{rd}$ generation UMTS (Universal Mobile Telephone System).

However the multimedia terminal is implemented and no matter where it is located, it is likely to exchange multimedia content with a communications network that comprises both circuit switched and packet-based telecommunications links and which may include a mobile telecommunications network including a radio link. For example, an H.324/I multimedia terminal connected to an ISDN network may form a connection with an H.324/M terminal in a PLMN mobile telephone network. Multimedia data transmitted between the terminals through the network will be subject to various sources of error and data loss. These are likely to include bit-reversal errors, for example due to interference affecting the radio communications link and packet losses due to possible congestion in the core ISDN network. Thus, it is advantageous to implement the video encoders of the communicating multimedia terminals in such a way as to provide a video bit-stream with a high degree of resilience to transmission errors. As described earlier in the text, the method of video encoding according to the present invention provides video sequences compressed using temporal prediction techniques with additional error-resilience. Therefore, it is ideally suited for implementation in multimedia terminals and particularly in devices that are likely to be used over communication channels prone to error.

It should be noted that in multimedia terminals designed for two-way communication i.e. for transmission and reception of video data, it is necessary to provide both a video encoder and video decoder implemented according to the present invention. Because a video encoder according to an embodiment of the invention may change the order in which frames are compressed, it is necessary for the video decoder of the receiving terminal to order the received frames correctly prior to display. Thus, a typical multimedia terminal according to the invention will include an encoder/decoder pair implementing the previously described encoding/decoding methods. Such an encoder and decoder pair is often implemented as a single combined functional unit referred to as a 'codec'. On the other hand, if the multimedia terminal is intended for use only as a multimedia retrieval client, it need only include a decoder implemented according to the present invention.

A typical H.324 multimedia terminal will now be described in further detail with reference to FIG. 16. The multimedia terminal 160 includes a variety of so-called 'terminal equipment'. This includes video, audio and telematic devices, denoted generically by reference numbers 161, 162 and 163, respectively. The video equipment 161 may include, for example, a video camera for capturing video images, a monitor for displaying received video content and optional video processing equipment. The audio equipment 162 typically includes a microphone e.g. for capturing spoken messages, and a loudspeaker for reproducing received audio content. The audio equipment may also include additional audio processing units. The telematic equipment 163, may include a data terminal, keyboard, electronic whiteboard or a still image transceiver, such as a fax unit.

The video equipment is coupled to a video codec 165. The video codec comprises a video encoder and a corresponding video decoder. It is responsible for encoding captured video data in an appropriate form for further transmission over a communications link and decoding compressed video content received from the communications network. In the example illustrated in FIG. 16, the video codec is implemented according to ITU-T recommendation H.263, which is particularly suitable for use in low bit-rate video conferencing applications, where the communications link is a radio channel with an available bandwidth of e.g. 20 kbps.

Similarly, the terminal's audio equipment is coupled to an audio codec, denoted in FIG. 16 by reference number 166. In this example, the audio codec is implemented according to ITU-T recommendation G.723.1. Like the video codec, the audio codec comprises an encoder/decoder pair. It converts audio data captured by the terminal's audio equipment into a form suitable for transmission over the communications link and transforms encoded audio data received from the network back into a form suitable for reproduction e.g. on the terminal's loudspeaker. The output of the audio codec is passed to a delay block 167. This compensates for the delays introduced by the video coding process and thus ensures synchronisation of audio and video content.

The system control block 164 of the multimedia terminal controls end-to-network signalling to establish a common mode of operation between a transmitting and a receiving terminal. H.324 specifies that end-to-end signalling is to be performed using a control protocol defined in ITU-T recommendation H.245. The H.245 control protocol, denoted by reference number 168 in FIG. 16, exchanges information about the encoding and decoding capabilities of the transmitting and receiving terminals and can be used to enable the various coding modes of the video encoder. The system control block 164 also controls the use of data encryption according to ITU-T recommendation H.233. Information regarding the type of encryption to be used in data transmission is passed from encryption block 169 to the multiplexer/demultiplexer (MUX/DMUX unit) 170.

During data transmission from the multimedia terminal, the MUX/DMUX unit 170 combines encoded and synchronised video and audio streams with data input from the telematic equipment 163, to form a single bit-stream. Information concerning the type of data encryption (if any) to be applied to the bit-stream, provided by encryption block 169, is used to select an encryption mode. Correspondingly, when a multiplexed and possibly encrypted multimedia bit-stream is being received, MUX/DMUX unit 170 is responsible for decrypting the bit-stream, dividing it into its constituent multimedia components and passing those components to the appropriate codec(s) and/or terminal equipment for decoding and reproduction. According to the H.324 standard, MUX/DMUX unit 170 should implement ITU-T recommendation H.223.

It should be noted that the functional elements of the multimedia content creation system, multimedia terminal, multimedia retrieval client, video encoder, decoder and video codec according to the invention can be implemented as software or dedicated hardware, or a combination of the two. The video encoding and decoding methods according to the invention are particularly suited for implementation in the form of a computer program comprising machine-readable instructions for performing the functional steps of the invention. As such, the encoder and decoder according to the invention may be implemented as software code stored on a storage medium and executed in a computer, such as a personal desktop computer, in order to provide that computer with video encoding and/or decoding functionality.

In order to highlight the advantages provided by the invention, its behaviour in a packet loss situation will be examined by considering the results of a simulation experiment. In this example, it is assumed that a video encoder, designed to implement the encoding method according to the invention, is used to encode QCIF (Quarter Common Intermediate Format) video frames at a rate of 10 frames per second. Periodic INTRA frame requests occur at 5-second intervals, but no INTRA frame requests arise due to scene cuts within the video sequence. The amount of data required to represent an INTRA coded frame is assumed to be 2000 bytes and the size of an INTER frame is approximately 200 bytes. These figures are typical of INTRA and INTER coded QCIF format frames coded according to currently used video coding standards such as ITU-T recommendation H.263.

A typical maximum size of a protocol data unit used for data transmission in the Internet and Local Area Networks (LANs) is approximately 1500 bytes. Assuming this packet size, a typical INTRA coded frame requires two packets for its transmission. On the other hand, one packet may carry seven INTER frames. This means that in order to transmit 50 frames, constituting 5 seconds of video, a total of 9 packets are required. Assuming that the sequence starts with an INTRA frame (as is usual), a typical 5-second sequence of video comprises one INTRA frame and 49 INTER coded frames. As described above, the INTRA frame requires two packets for its transmission, while the remaining 49 INTER coded frames may be accommodated in 7 packets, hence the total requirement of 9 packets. It should be noted that it is advantageous to use large packets for data transmission over the Internet. Firstly, within the Internet backbone, the probability of packet loss is essentially independent of packet size and secondly, the packet header overhead is reduced if large packets are used.

Applying the encoding method according to the invention, the encoder uses a buffer whose duration is 5 seconds +1 frame to store the incoming video frames in QCIF format. When the encoding process is started, the buffer is initially empty and is filled with uncompressed QCIF video frames. The first frame in the sequence is associated with an INTRA request. Because the length of the buffer in this example is chosen to coincide with the periodic INTRA refresh request rate and because it is assumed that no scene cuts or INTRA frame update requests occur during the period of time considered, the last frame stored in the buffer will be associated with the next INTRA request. Thus, the encoder is able to locate an uncompressed frame within the buffer whose time of occurrence is approximately mid-way between the two INTRA frame requests. This frame is selected for coding in INTRA format (i.e. it is selected to be the actual INTRA frame) and the previously described coding processes is applied to the frames within the buffer. In the simulation considered here, it is further assumed that, having been coded, the now compressed video frames are transmitted in a packet-based communications network and that the communications channel is subject to congestion, resulting in the loss of a certain proportion of the transmitted packets. The simulated bit-rate is 18880 bps, the target bit-rate for audiovisual streaming over the Internet using a 28.8 kbps modem.

The following tables compare the error resilience of the encoding method according to the invention with that of a conventional encoding scheme, in which all frames associated with INTRA requests are themselves coded in INTRA format (i.e. as illustrated in FIG. 7). Table 4 displays frame-loss figures for a case in which, on average, one packet in every nine is lost (11% packet loss), while Table 5 presents equivalent figures for a situation in which 2 packets in every nine are lost (22% packet loss).

TABLE 4

Frame Loss Rates of Conventional and Inventive Methods with 11% Packet Loss

|  | Conventional Method | Invented Method |
|---|---|---|
| Expected number of lost pictures | 33 | 25 |
| Expected picture loss percentage | 66% | 49% |

TABLE 5

Frame Loss Rates of Conventional and Inventive Methods with 22% Packet Loss

|  | Conventional Method | Invented Method |
|---|---|---|
| Expected number of lost pictures | 43 | 35 |
| Expected picture loss percentage | 85% | 71% |

Both cases presented above show that fewer frames are lost when the method according to the invention is used.

In the foregoing text, the method according to the invention has been described with the aid of exemplary embodiments. It should be apparent to a person of ordinary skill in the art that the invention is not limited to the precise details of the aforementioned exemplary embodiments and that it may be implemented other forms without departing from its essential attributes and characteristics. Therefore, the exemplary embodiments presented above should be considered illustrative rather than limiting. Accordingly, reference should be made to the appended patent claims and the general statements of inventive concept presented herein as an indication of the scope of the present invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof, irrespective of whether it relates to the claimed invention or mitigates any or all of the problems addressed.

The appended abstract as filed herewith is included in the specification by reference.

What is claimed is:

1. A method of encoding a set of video frames, the method comprising an apparatus:
    receiving an indication associated with a first video frame of the set of video frames, the indication indicating that the first video frame is to be encoded in a non-temporally-predicted video frame format;
    choosing a second video frame of the set of video frames to be encoded in the non-temporally-predicted video frame format instead of the first video frame;
    encoding the chosen second video frame in the non-temporally-predicted video frame format instead of the first video frame;
    encoding a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and
    encoding a second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and
    wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

2. A method according to claim 1, wherein the non-temporally-predicted video frame format is an INTRA-frame format.

3. A method according to claim 1, further comprising encoding the first sub-set of video frames in an INTER-frame format.

4. A method according to claim 1, further comprising encoding the first sub-set of video frames in a B-frame format.

5. A method according to claim 3, further comprising encoding the first sub-set of video frames, wherein the encoding the first sub-set of video frames includes:
    assigning each of the N video frames of the first sub-set of video frames a sequential compression order number, the video frame of the first sub-set of video frames occurring latest in the temporal order being assigned a lowest compression order number and the video frame of the first sub-set of video frames occurring earliest in the temporal order being assigned a highest compression order number;
    indicating the chosen second video frame as a prediction reference frame for encoding the video frame having the lowest compression order number in INTER-frame format; and
    encoding the video frames of the first sub-set of video frames in INTER-frame format in ascending order of compression order number.

6. A method according to claim 1, comprising assigning each of the N video frames of the first sub-set of video frames a compression order number and encoding the N video frames in an order determined by their assigned compression order numbers.

7. A method according to claim 4, comprising encoding the first sub-set of video frames, wherein the encoding the first sub-set of video frames includes:
    indicating the chosen second video frame as a prediction reference frame for each of the N video frames of the first sub-set of video frames; and encoding the video frames of the first sub-set of video frames in the B-frame format with reference to the chosen second video frame.

8. A method according to claim 1, comprising encoding the second sub-set of video frames, wherein the encoding the second sub-set of video frames includes:
assigning each of the M video frames of the second sub-set of video frames a sequential compression order number, the video frame of the second sub-set of video frames occurring earliest in the temporal order being assigned a lowest compression order number and the video frame of the second sub-set of video frames occurring latest in the temporal order being assigned a highest compression order number;
indicating the chosen second video frame as a prediction reference frame for encoding the video frame having the lowest compression order number in INTER-frame format; and
encoding the video frames of the second sub-set of video frames in INTER-frame format in ascending order of compression order number.

9. A method according to claim 1, comprising assigning each of the M video frames of the second sub-set of video frames a compression order number and encoding the M video frames in an order determined by their assigned compression order numbers.

10. A method according to claim 1, comprising receiving an INTRA frame request associated with a scene cut, the INTRA frame request indicating that the first video frame is to be encoded in the non-temporally-predicted video frame format.

11. A method according to claim 1, comprising receiving a periodic INTRA frame request, the periodic INTRA frame request indicating that the first video frame is to be encoded in the non-temporally-predicted video frame format.

12. A method according to claim 1, comprising receiving an INTRA frame update request as feedback from a receiving terminal, the INTRA frame update request indicating that the first video frame is to be encoded in the non-temporally-predicted video frame format.

13. A method according to claim 1, comprising selecting the chosen second video frame as a video frame occurring substantially at the mid-point of the set of video frames.

14. A method according to claim 1, further comprising providing information concerning the intended playback order of the video frames.

15. A method according to claim 1, further comprising providing information concerning the intended playback time of the video frames.

16. A method according to claim 1, comprising encoding B-frames between successive video frames of the first sub-set of video frames.

17. A method according to claim 1, comprising encoding B-frames between successive video frames of the second sub-set of video frames.

18. An encoder for encoding a set of video frames, the encoder being configured to:
receive an indication associated with a first video frame of the set of video frames, the indication indicating that the first video frame is to be encoded in a non-temporally-predicted video frame format;
choose a second video frame of the set of video frames to be encoded in the non-temporally-predicted video frame format instead of the first video frame;
encode the chosen second video frame in the non-temporally-predicted video frame format instead of the first video frame;
encode a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and
encode a second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and
wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

19. An encoder according to claim 18, wherein the non-temporally-predicted video frame format is an INTRA frame format.

20. An encoder according to claim 18, wherein the encoder is configured to encode the first sub-set of video frames in an INTER-frame format.

21. An encoder according to claim 18, wherein the encoder is configured to encode the first sub-set of video frames in a B-frame format.

22. An encoder according to claim 18, wherein the encoder is configured to:
assign each of the N video frames of the first sub-set of video frames a sequential compression order number, the video frame of the first sub-set of video frames occurring latest in the temporal order being assigned a lowest compression order number and the video frame of the first sub-set of video frames occurring earliest in the temporal order being assigned a highest compression order number;
indicate the chosen second video frame as a prediction reference frame for encoding the video frame having the lowest compression order number in INTER-frame format; and
encode the video frames of the first sub-set of video frames in INTER-frame format in ascending order of compression order number.

23. An encoder according to claim 18, wherein the encoder is configured to assign each of the N video frames of the first sub-set of video frames a compression order number and to encode the N video frames in an order determined by their assigned compression order numbers.

24. An encoder according to claim 21, wherein the encoder is configured to:
indicate the chosen second video frame as a prediction reference frame for each of the N video frames of the first sub-set of video frames; and
encode the video frames of the first sub-set of video frames in the B-frame format with reference to the chosen second video frame.

25. An encoder according to claim 18, wherein the encoder is configured to:
assign each of the M video frames of the second sub-set of video frames a sequential compression order number, the video frame of the second sub-set of video frames occurring earliest in the temporal order being assigned a lowest compression order number and the video frame of the second sub-set of video frames occurring latest in the temporal order being assigned a highest compression order number;

indicate the chosen second video frame as a prediction reference frame for encoding the video frame having the lowest compression order number in INTER-frame format; and encode the video frames of the second sub-set of video frames in INTER-frame format in ascending order of compression order number.

26. An encoder according to claim 18, wherein the encoder is configured to assign each of the M video frames of the second sub-set of video frames a compression order number and to encode the M video frames in an order determined by their assigned compression order numbers.

27. An encoder according to claim 18, wherein the encoder is configured to receive an INTRA frame request associated with a scene cut, the INTRA frame request indicating that the first video frame is to be encoded in the non-temporally-predicted video frame format.

28. An encoder according to claim 18, wherein the encoder is configured to receive a periodic INTRA frame request, the periodic INTRA frame request indicating that the first video frame is to be encoded in the non-temporally-predicted video frame format.

29. An encoder according to claim 18, wherein the encoder is configured to receive an INTRA frame update request as feedback from a receiving terminal, the INTRA frame update request indicating that the first video frame is to be encoded in the non-temporally-predicted video frame format.

30. An encoder according to claim 18, wherein the encoder is configured to select the chosen second video frame as a video frame occurring substantially at the mid-point of the set of video frames.

31. An encoder according to claim 18, wherein the encoder is further configured to provide information concerning the intended playback order of the video frames.

32. An encoder according to claim 18, wherein the encoder is further configured to provide information concerning the intended playback time of the video frames.

33. An encoder according to claim 18, wherein the encoder is configured to encode B-frames between successive video frames of the first sub-set of video frames.

34. An encoder according to claim 18, wherein the encoder is configured to encode B-frames between successive video frames of the second sub-set of video frames.

35. A video codec comprising an encoder for encoding a set of video frames, the encoder being configured to:

receive an indication associated with a first video frame of the set of video frames, the indication indicating that the first video frame is to be encoded in a non-temporally-predicted video frame format;

choose a second video frame of the set of video frames to be encoded in the non-temporally-predicted video frame format instead of the first video frame;

encode the chosen second video frame in the non-temporally-predicted video frame format instead of the first video frame;

encode a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and encode a second sub-set of video frames, in temporal order, in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

36. A multimedia content creation system comprising an encoder for encoding a set of video frames, the encoder being configured to:

receive an indication associated with a first video frame of the set of video frames, the indication indicating that the first video frame is to be encoded in a non-temporally-predicted video frame format;

choose a second video frame of the set of video frames to be encoded in the non-temporally-predicted video frame format instead of the first video frame;

encode the chosen second video frame in the non-temporally-predicted video frame format instead of the first video frame;

encode a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and encode a second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

37. A multimedia terminal comprising an encoder for encoding a set of video frames, the encoder being configured to:

receive an indication associated with a first video frame of the set of video frames, the indication indicating that the first video frame is to be encoded in a non-temporally-predicted video frame format;

choose a second video frame of the set of video frames to be encoded in the non-temporally-predicted video frame format instead of the first video frame;

encode the chosen second video frame in the non-temporally-predicted video frame format instead of the first video frame;

encode a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and encode a second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

38. A multimedia terminal according to claim 37, wherein the terminal is a radio telecommunications device.

39. A method of decoding a set of encoded video frames to recover a corresponding set of video frames, the decoding method comprising an apparatus:

receiving and decoding a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;

decoding a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and decoding a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

40. A method according to claim 39, wherein the non-temporally-predicted video frame format is an INTRA-frame format.

41. A method according to claim 39, wherein the first sub-set of encoded video frames are encoded in an INTER-frame format.

42. A method according to claim 39, wherein the first sub-set of encoded video frames are encoded in a B-frame format.

43. A method according to claim 39, wherein the second sub-set of encoded video frames are encoded in an INTER-frame format.

44. A method according to claim 39, further comprising decoding B-frames between successive video frames decoded from the first sub-set of encoded video frames.

45. A method according to claim 39, further comprising decoding B-frames between successive video frames decoded from the second sub-set of encoded video frames.

46. A decoder for decoding a set of encoded video frames to recover a corresponding set of video frames, the decoder being configured to:

receive and decode a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;

decode a first sub-set of encoded video frames, using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and decode a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

47. A video codec comprising a decoder for decoding a set of encoded video frames to recover a corresponding set of video frames, the decoder being configured to:

receive and decode a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;

decode a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and decode a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

48. A multimedia content retrieval system comprising a decoder for decoding a set of encoded video frames to recover a corresponding set of video frames, the decoder being configured to:
  receive and decode a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;
  decode a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and
  decode a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

49. A multimedia terminal comprising a decoder for decoding a set of encoded video frames to recover a corresponding set of video frames, the decoder being configured to:
  receive and decode a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;
  decode a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and
  decode a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

50. A multimedia terminal according to claim 49, wherein the multimedia terminal is a radio telecommunications device.

51. A non-transitory computer-readable medium having computer-readable instructions stored thereon, the instructions comprising:
  instructions for receiving an indication associated with a first video frame of the set of video frames, the indication indicating that the first video frame is to be encoded in a non-temporally-predicted video frame format;
  instructions for choosing a second video frames of the set of video frames to be encoded in the non-temporally-predicted video frame format instead of the first video frame;
  instructions for encoding the chosen second video frame in the non-temporally-predicted video frame format instead of the first video frame;
  instructions for encoding a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and
  instructions for encoding the second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and
  wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

52. A non-transitory computer-readable medium having computer-readable instructions stored thereon, the instructions comprising:
  instructions for receiving and decoding a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;
  instructions for decoding a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and
  instructions for decoding a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

53. An apparatus for encoding a set of video frames to produce a corresponding set of encoded video frames, the apparatus being configured to:
receive an indication associated with a first video frame of the set of video frames, the indication indicating that the first video frame is to be encoded in a non-temporally-predicted video frame format;
choose a second video frame of the set of video frames to be encoded in the non-temporally-predicted video frame format instead of the first video frame;
encode the chosen second video frame in the non-temporally-predicted video frame format instead of the first video frame;
encode a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and
encode a second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and
wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

54. An apparatus for encoding a set of video frames to produce a corresponding set of encoded video frames, the apparatus comprising:
means for receiving an indication associated with a first video frame of the set of video frames, the indication indicating that the first video frame is to be encoded in a non-temporally-predicted video frame format
means for choosing a second video frame of the set of video frames to be encoded in the non-temporally-predicted video frame format instead of the first video frame;
means for encoding the chosen second video frame in the non-temporally-predicted video frame format instead of the first video frame;
means for encoding a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and
means for encoding a second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and
wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

55. An apparatus for decoding a set of encoded video frames to recover a corresponding set of video frames, the apparatus being configured to:
receive and decode a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;
decode a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and
decode a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

56. An apparatus for decoding a set of encoded video frames to recover a corresponding set of video frames the apparatus comprising:
means for receiving and decoding a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;
means for decoding a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and
means for decoding a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

57. An apparatus for encoding a set of video frames to produce a corresponding set of encoded video frames, the apparatus comprising:
- a receiving unit configured to receive an indication associated with a first video frame of the set of video frames, the indication indicating that the first video frame is to be encoded in a non-temporally-predicted video frame format;
- a selection unit configured to choose a second video frame of the set of video frames to be encoded in the non-temporally-predicted video frame format instead of the first video frame; and
- an encoder configured to:
  - encode the chosen second video frame in the non-temporally-predicted video frame format instead of said particular the first video frame;
  - encode a first sub-set of video frames in a temporally-backward-predicted video frame format using the chosen second video frame as a starting point for temporal prediction, wherein the first sub-set of video frames comprises N video frames of the set of video frames, and wherein the N video frames occur prior to the chosen second video frame in temporal order; and
  - encode a second sub-set of video frames in a temporally-forward-predicted video frame format using the chosen second video frame as a starting point for temporal prediction, wherein the second sub-set of video frames comprises M video frames of the set of video frames, wherein the M video frames occur after the chosen second video frame in temporal order, and
  - wherein the selection of the chosen second video frame provides respective prediction path lengths for the first and second sub-sets of video frames that reduce the likelihood of error propagation when decoding the set of encoded video frames compared with the likelihood of error propagation that would have existed when decoding the set of encoded video frames if the first video frame had been used as the starting point for temporal prediction.

58. An apparatus for decoding a set of encoded video frames to recover a corresponding set of video frames, the apparatus comprising:
- a decoder configured to:
  - receive and decode a chosen video frame, wherein the chosen video frame is encoded in a non-temporally-predicted video frame format instead of another video frame, and wherein selection of the chosen video frame provides respective prediction path lengths for first and second sub-sets of video frames that reduce the likelihood of error propagation when decoding the set of encoded video frames compared with the likelihood of error propagation that would have existed when decoding the set of encoded video frames if the other video frame had been used as the starting point for temporal prediction;
  - decode a first sub-set of encoded video frames using prediction in a temporally backward direction using the chosen video frame as a starting point for temporal prediction, wherein the first sub-set of encoded video frames is representative of N video frames of the corresponding set of video frames, and wherein the N video frames occur prior to the chosen video frame in temporal order; and
  - decode a second sub-set of encoded video frames using prediction in a temporally forward direction using the chosen video frame as a starting point for temporal prediction, wherein the second sub-set of encoded video frames is representative of M video frames of the corresponding set of video frames, and wherein the M video frames occur after the chosen video frame in temporal order.

* * * * *

UNITED STATES PATENT AND TRADEMARK OFFICE
CERTIFICATE OF CORRECTION

| | | |
|---|---|---|
| PATENT NO. | : 8,355,437 B2 | Page 1 of 1 |
| APPLICATION NO. | : 11/037192 | |
| DATED | : January 15, 2013 | |
| INVENTOR(S) | : Hannuksela | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1692 days.

Signed and Sealed this
Sixteenth Day of September, 2014

Michelle K. Lee
*Deputy Director of the United States Patent and Trademark Office*